(12) United States Patent
Andersson et al.

(10) Patent No.: US 10,757,429 B2
(45) Date of Patent: *Aug. 25, 2020

(54) METHOD AND ARRANGEMENT FOR VIDEO TRANSCODING USING MODE OR MOTION OR IN-LOOP FILTER INFORMATION

(71) Applicant: TELEFONAKTIEBOLAGET LM ERICSSON (PUBL), Stockholm (SE)

(72) Inventors: Kenneth Andersson, Gävle (SE); Thomas Rusert, Stockholm (SE); Rickard Sjöberg, Stockholm (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 16/193,518

(22) Filed: Nov. 16, 2018

(65) Prior Publication Data

US 2019/0089968 A1  Mar. 21, 2019

Related U.S. Application Data

(63) Continuation of application No. 15/028,479, filed as application No. PCT/SE2013/051196 on Oct. 11, 2013, now Pat. No. 10,178,398.

(51) Int. Cl.
*H04N 7/18* (2006.01)
*H04N 19/40* (2014.01)
(Continued)

(52) U.S. Cl.
CPC ........... *H04N 19/40* (2014.11); *H04N 19/157* (2014.11); *H04N 19/197* (2014.11); *H04N 19/33* (2014.11);
(Continued)

(58) Field of Classification Search
CPC ................ H04N 19/40; H04N 19/157; H04N 21/23439; H04N 21/234363; H04N 19/59;
(Continued)

(56) References Cited

U.S. PATENT DOCUMENTS 7,987,096 B2   7/2011  Kim et al.
8,320,450 B2   11/2012 Eleftheriadis et al.
(Continued)

OTHER PUBLICATIONS

Fernández-Escribano et al, an mpeg-2 to H.264 video transcoder in the baseline profile (Year: 2010).*
(Continued)

*Primary Examiner* — Shan E Elahi
(74) *Attorney, Agent, or Firm* — Rothwell, Figg, Ernst & Manbeck, P.C.

(57) ABSTRACT

In a method of transcoding of a video bitstream by a transcoder arrangement, performing the steps of receiving (S10) a video bitstream with a predetermined input video format, receiving (S20) side information related to the video bitstream, the side information comprising at least one of mode or motion or in-loop filter information relating to at least one other predetermined video format for the video bitstream. Further, performing the steps of decoding (S40) the received side information to generate transcoding guiding information, and encoding (S50) a representation of the received video bitstream based at least on the generated transcoding guiding information, to provide a transcoded video bitstream with a predetermined output video format.

20 Claims, 12 Drawing Sheets

(51) Int. Cl.
*H04N 19/196* (2014.01)
*H04N 19/46* (2014.01)
*H04N 19/513* (2014.01)
*H04N 19/33* (2014.01)
*H04N 19/59* (2014.01)
*H04N 21/2343* (2011.01)
*H04N 19/157* (2014.01)

(52) U.S. Cl.
CPC ........... *H04N 19/46* (2014.11); *H04N 19/513* (2014.11); *H04N 19/59* (2014.11); *H04N 21/23439* (2013.01); *H04N 21/234363* (2013.01)

(58) Field of Classification Search
CPC ...... H04N 19/33; H04N 19/513; H04N 19/46; H04N 19/197
USPC ...................................... 375/240.02
See application file for complete search history.

(56) References Cited

U.S. PATENT DOCUMENTS

| | | | |
|---|---|---|---|
| 8,681,865 | B2 | 3/2014 | Eleftheriadis et al. |
| 9,930,351 | B2 | 3/2018 | Andersson et al. |
| 2003/0215011 | A1 | 11/2003 | Wang et al. |
| 2004/0045030 | A1 | 3/2004 | Reynolds et al. |
| 2005/0213664 | A1 | 9/2005 | Mahkonen et al. |
| 2007/0189616 | A1 | 8/2007 | Mitchell et al. |
| 2007/0230568 | A1 | 10/2007 | Eleftheriadis et al. |
| 2008/0170611 | A1 | 7/2008 | Ramaswamy |
| 2010/0046612 | A1 | 2/2010 | Sun et al. |
| 2010/0208804 | A1 | 8/2010 | Yu et al. |
| 2011/0090965 | A1* | 4/2011 | Chan ................... H04N 19/577 375/240.16 |
| 2011/0293001 | A1 | 12/2011 | Lim et al. |
| 2012/0002728 | A1 | 1/2012 | Eleftheriadis et al. |
| 2012/0106622 | A1 | 5/2012 | Huang et al. |
| 2012/0179833 | A1 | 7/2012 | Kenrick |
| 2012/0320969 | A1 | 12/2012 | Zheng et al. |
| 2013/0022104 | A1* | 1/2013 | Chen ...................... H04N 19/70 375/240.02 |
| 2013/0083839 | A1* | 4/2013 | Yang ...................... H04N 19/86 375/240.02 |
| 2013/0083841 | A1* | 4/2013 | Shen ..................... H04N 19/895 375/240.02 |
| 2013/0083842 | A1* | 4/2013 | Wan ....................... H04N 19/40 375/240.02 |
| 2013/0279602 | A1* | 10/2013 | Wang ................... H04N 19/136 375/240.26 |
| 2013/0308707 | A1* | 11/2013 | Raveendran ......... H04N 19/132 375/240.24 |
| 2013/0322523 | A1* | 12/2013 | Huang ................. H04N 19/182 375/240.02 |
| 2014/0092963 | A1* | 4/2014 | Wang ..................... H04N 19/50 375/240.12 |
| 2014/0092994 | A1* | 4/2014 | Wang ..................... H04N 19/46 375/240.26 |
| 2014/0301463 | A1* | 10/2014 | Rusanovskyy ......... H04N 19/52 375/240.14 |

OTHER PUBLICATIONS

Liu et al, Faster inter mode decision algorithm based on the MB activity for MPEG-2 to H.264/AVC transcoding (Year: 2009).*
International Search Report and Written Opinion dated May 26, 2014, in International Application No. PCT/SE2013/051196, 12 pages.
Ahmad et al. "Video Transcoding: An Overview of Various Techniques and Research Issues" IEEE Transactions on Multimedia, vol. 7, No. 5, pp. 793-804.
European Communication dated Nov. 3, 2017, issued in European Patent Application No. 13786329.6, 4 pages.
Golin et al., Fast Transcoding of Compressed Bitstreams by Reusing Incoming Moton Vectors (Year: 1998).
Sostawa et al., DSP-based transcoding of digital video signals with MPEG-2 format (Year: 2000).
European Communication dated May 22, 2019, issued in European Patent Application No. 13786329.6, 5 pages.

* cited by examiner

METHOD AND ARRANGEMENT FOR VIDEO TRANSCODING USING MODE OR MOTION OR IN-LOOP FILTER INFORMATION

CROSS REFERENCE TO RELATED APPLICATION(S)

This application is a continuation of 15/028,479, filed Apr. 11, 2016, which is a 35 U.S.C. § 371 National Phase Entry Application from PCT/SE2013/051196, filed Oct. 11, 2013, designating the United States, the disclosures of which are incorporated herein by reference in their entirety.

TECHNICAL FIELD

The proposed technology generally relates to methods and arrangements for transcoding of video media in fixed or wireless communication systems.

BACKGROUND

When video media is transmitted in a fixed or wireless communication system it is typically adapted or transcoded at some intermediate node between a source e.g. media provider, and a sink e.g. viewing device such as a mobile device. During the adaptation the video media is typically compressed which necessitates a selection of bitrate etc at the source node. An optimal bitrate would take both the network capabilities and the sink capabilities into consideration in order to utilize both the uplink and the downlink most efficiently. Thereby at time of encoding the video at the source, the source node is unaware of the end user capabilities and the network capabilities, and thus the intermediate node needs to adapt the video in order to provide it to the sink at a desired or necessary format. This requires a high quality from the source and a high level of computational complexity on the adaptation or transcoding node in order to optimize the use of downlink capabilities.

With reference to the above, there is a need for means and methods enabling adaptation or transcoding of video media in an improved manner in order to optimize the utilization of the uplink and downlink resources.

SUMMARY

It is an object to provide a solution that obviates some or all of the above described disadvantages.

This and other objects are met by embodiments of the proposed technology.

According to a first aspect, there is provided a method of transcoding of a video bitstream by a transcoder arrangement. The method includes the steps of receiving a video bitstream with a predetermined input video format, and receiving side information related to the video bitstream, the side information comprising at least one of mode or motion or in-loop filter information relating to at least one other predetermined video format for the video bitstream. Further, the method includes the steps of decoding the received side information to generate transcoding guiding information, and encoding a representation of the received video bitstream based at least on the generated transcoding guiding information, to provide a transcoded video bitstream with a predetermined output video format.

According to a second aspect, there is provided a transcoder arrangement for transcoding a video bitstream. The transcoder arrangement includes a video receiver configured for receiving a video bitstream with a first predetermined input video format and at least one side information utilization unit. The side information utilization unit includes a side information receiver configured for receiving side information related to the video bitstream, the side information comprising at least one of mode or motion or in-loop filter information relating to at least one other predetermined video format for the video bitstream, and a side information decoder configured for decoding the received side information to generate transcoding guiding information. Finally, the transcoder arrangement includes an encoder configured for encoding a representation of the received video bitstream based at least on the generated transcoding guiding information, to provide a transcoded video bitstream with a predetermined output video format.

According to a third and fourth aspect there is provided a network node or a user equipment comprising a transcoder arrangement according to the above second aspects.

According to a fifth aspect, there is provided an arrangement for transcoding of a video bitstream. The arrangement comprises a video bitstream receiving module for receiving a video bitstream with a first predetermined input video format, and a side information receiving module for receiving side information related to the video bitstream, the side information comprising at least one of mode or motion or in-loop filter information relating to at least one other predetermined video format for the video bitstream. Further, the arrangement includes a decoding module for decoding the received side information to generate transcoding guiding information, and an encoding module (324) for encoding a representation of the received video bitstream based at least on the generated transcoding guiding information, to provide a transcoded video bitstream with a predetermined output video format.

According to a sixth aspect, there is provided a method for providing an encoded video bitstream. The method includes the steps of encoding a provided video bitstream with a predetermined video format, and generating side information related to the encoded provided video bitstream, said side information comprising at least one of mode or motion or in-loop filter information relating to at least one other predetermined video format for the video bitstream. Further, the method includes the step of transmitting the encoded video bitstream and the generated side information to a node.

According to a seventh aspect, there is provided an arrangement for providing a video bitstream. The arrangement includes an encoder configured for encoding a video bitstream with a predetermined video format, and a side information generator configured for generating side information related to the video bitstream, the side information comprising at least one of mode or motion or in-loop filter information relating to at least one other predetermined video format for the video bitstream. Further, the arrangement includes a transmitter configured for transmitting the encoded video bitstream and the generated side information to a node.

According to an eighth and ninth aspect, there is provided a network node comprising an arrangement according to the seventh aspect and a user equipment comprising an arrangement according to the seventh aspect.

According to a tenth aspect, there is provided an arrangement for providing a video bitstream. The arrangement includes an encoder module for encoding a video bitstream with a predetermined video format, and a side information module for generating side information related to the video bitstream, the side information comprising at least one of mode or motion or in-loop filter information relating to at least one other predetermined video format for the video bitstream. Further, the arrangement includes a transmitter module for transmitting the encoded video bitstream and the generated side information to a node.

Embodiments of the proposed technology enables/makes it possible to reduce the computational complexity of the adaptation or transcoding process.

Other advantages will be appreciated when reading the detailed description.

BRIEF DESCRIPTION OF THE DRAWINGS

The embodiments, together with further objects and advantages thereof, may best be understood by referring to the following description taken together with the accompanying drawings, in which.

DETAILED DESCRIPTION

Figure 1:
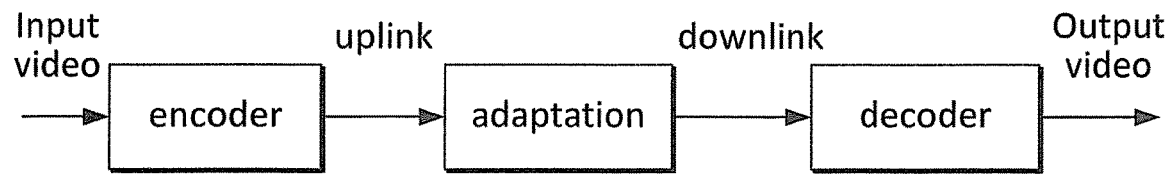
FIG. 1 is an illustration of a known adaptation scheme.

Throughout the drawings, the same reference numbers are used for similar or corresponding elements.

As used herein, the term "User Equipment", UE, may refer to a mobile phone, a cellular phone, a Personal Digital Assistant, PDA, equipped with radio communication capabilities, a smart phone, a laptop or Personal Computer, PC, equipped with an internal or external mobile broadband modem, a tablet PC with radio communication capabilities, a portable electronic radio communication device, a sensor device equipped with radio communication capabilities or the like. In particular, the term "UE" should be interpreted as a non-limiting term comprising any device equipped with radio circuitry for fixed or wireless communication of video content in a fixed or wireless communication system according to any relevant communication standard.

As used herein, the term "radio network node" or simply "network node" may refer to base stations, network control nodes, and the like. In particular, the term "base station" may encompass different types of radio base stations including standardized base stations such as Node Bs, or evolved Node Bs, eNBs, and also macro/micro/pico radio base stations, home base stations, also known as femto base stations, relay nodes, repeaters, radio access points, and even radio control nodes controlling one or more Remote Radio Units, RRUs, or the like. Further, a network node can comprise any type of network node, fixed or wireless, which is capable of transmitting, receiving or relaying video content in a fixed or wireless communication system.

The proposed technology is best understood in the context of a system wherein a source node, such as a video provider, provides both an encoded video bitstream as input video signal and side information to an intermediate node, such as a transcoding or adaptation node, which in turn provides an encoded video bitstream as an output video signal. The output video signal can subsequently be received and displayed at a sink node, such as a user equipment or the like.

For a better understanding of the proposed technology, it may be useful to begin with a brief overview of current adaptation and transcoding methods and their benefits and disadvantages (if any).

The problem as mentioned in the background is further described with respect to FIG. 1 that depicts a scenario where an input video signal is encoded (compressed) in a sending device (encoder), then transmitted through a network and/or stored (as denoted by uplink, adaptation, and downlink, which is explained further below), and then received and decoded (decompressed) by a receiving device (decoder). The output video can then e.g. be displayed to the end user.

Typically in video coding, encoding parameters such as coding algorithms to use (e.g. video coding standard and profile to use), video resolution, frame rate, quality, bit rate, etc., need to be decided at the time of encoding. The optimal encoding parameters depend on the capabilities of the receiving device (computational capabilities and memory) as well as the capacity of the network links involved (e.g. available bandwidth). In many scenarios, these parameters may not be known at the encoding time. This could for instance be the case when the network characteristics vary over time or over location of the receiver, or when the video is sent to more than one receiving device, each receiving device having different capabilities or different associated network access characteristics. In such cases, in order to optimally cope with available network resources, device characteristics and user experience when consuming the content, it is required to adapt the compressed video signal during the transmission in the network, as depicted by "adaptation" in FIG. 1.

The network link from the sender to the adaptation node is denoted as "uplink". The network link from the adaptation node to the receiver is denoted as "downlink". Both uplink and downlink bandwidths are typically scarce resources. In the case both sender and receiver are end-user devices (e.g. smartphone or laptop) connected to fixed or mobile networks, the uplink is typically a bottleneck, since uplink bandwidth is typically lower than downlink bandwidth (e.g. in ADSL networks or cellular networks). In the case the sender is a video server (such as streaming server, or video on demand server, or video cache) and the receiver is an end user-device (e.g. smartphone, tablet or TV), the downlink bandwidth is often a bottleneck which determines the video quality that can be delivered to the user (e.g. in the case the end-user is connected via DSL or cellular access). Furthermore, the uplink may be an expensive resource, too, e.g. in case many different content needs to be delivered from the sender (e.g. video on demand server) to end users (in this case the uplink could be a content distribution network, CDN).

Besides network capacity, other scarce resources include computational and memory capabilities in the sender and receiver, and in particular in the adaptation or transcoding node.

The problem to be solved is to provide a scheme for video encoding/adaptation/decoding to optimize network utilization by minimizing uplink and downlink bit rates, while at the same time minimizing the computational/memory complexity in the encoder, adaptation node, and decoder.

Video coding methods, such as H.264/AVC and H.265/HEVC, are typically based on the so-called hybrid video coding scheme.

In the hybrid video coding scheme, an encoder typically performs the following basic steps, applied to every picture in the video sequence, on a per-block basis:

1. A prediction operation, predicting the original video signal (pixel data) based on previously encoded (and reconstructed) pixel data, and computing the difference between the original video signal and the prediction. This difference is called "residual data" or "residual signal" or "residual". The prediction operation for a certain block can be based on pixels in the same picture as the currently encoded block, then called "intra prediction", or based on pixels in previously encoded pictures, then called "inter prediction". The source data used for the prediction is called "prediction reference". In order to improve inter prediction effectiveness, a so-called motion compensation operation is typically applied, which is based on motion vectors that indicate the displacement of the currently encoded block relative to the reference picture.

In order to achieve high compression efficiency, the encoder needs to try many different encoding parameters for each block (such as coding modes, block partitionings, motion vectors, etc.), a process that is sometimes referred to as mode/motion estimation and/or rate-distortion optimization (RDO). The process could be interpreted as a further step that precedes the prediction step.

2. A spatial transform operation is utilized to transform the prediction residual signal into a frequency domain.

3. The resulting transform coefficients are quantized and entropy-encoded (e.g. using context-adaptive binary arithmetic coding, CABAC). Further data such as indication of block partitioning, prediction mode (inter/intra), motion vectors, etc., is entropy encoded as well. The output of the entropy encoding stage is called "bitstream".

4. The encoder performs parts of the decoding process (see below) in order to generate reference information to be used for prediction of subsequently encoded blocks.

In the following, the application of inter and intra prediction operations and the generation of the residual data in the encoder (step 1 above) will be referred to as "motion-compensated residual generation".

The decoder in FIG. 1 typically performs the following basic steps, applied to every picture in the video sequence, on a per-block basis:

1. Entropy decoding quantized transform coefficients and other data to control the decoding/pixel reconstruction process.
2. Performing inverse transform of the decoded quantized transform coefficients to obtain the reconstructed prediction residual.
3. Performing prediction operations depending on the prediction mode and motion information signaled in the bitstream (inter/intra mode, motion vectors etc.), and adding the reconstructed prediction residual to the prediction, obtaining the intermediate reconstructed pixel data.
4. Performing filtering operations (e.g. de-blocking, sample-adaptive offset, SAO), depending on the intermediate reconstructed pixel data, generating the final reconstructed pixel data.

In the following, the application of inter and intra prediction operations and the generation of the intermediate and final reconstructed pixel data in the decoder will be referred to as "motion-compensated reconstruction".

Encoding is typically significantly more demanding than decoding in terms of computational complexity. The reason for that is that in order to achieve high compression efficiency, the encoder needs to try many different encoding parameters for each block (such as coding modes, block partitioning, motion vectors, etc.). The encoder is typically not standardized, so that encoders may choose to try few different encoder parameters; however, that will come at the cost of reduced compression efficiency.

Several video encoding/distribution concepts exist to address the abovementioned problem of adaptive video distribution. Those encoding/distribution concepts can be categorized into (1) simulcast distribution, (2) scalable video coding, (3) transcoding.

In the case of simulcast distribution, the sender encodes the video in several different video representations, i.e. with different encoding parameters such as different video resolutions, and the resulting compressed bitstreams are transmitted through the uplink simultaneously. Then in the adaptation node, the most appropriate video stream is selected, considering downlink properties and receiver properties. Simulcast is inefficient in terms of uplink usage because several bitstreams have to be sent for the same content. Simulcast imposes relatively low complexity in the adaptation, since it involves only selective forwarding of the most appropriate video representation. Simulcast is efficient in terms of downlink utilization because each compressed video bitstream can be fully optimized for the downlink, or at least considering receiver capabilities such as screen resolution. The adaptation node forwards one selected bitstream for the downlink, this utilizes the downlink with zero overhead.

In the case of scalable coding, the sender encodes several different video representations, similarly to simulcast. The main difference to simulcast is that in order to improve compression efficiency (and thus bandwidth utilization on the uplink), the representations are compressed in a dependent manner. One example of scalable coding is spatially scalable coding. Spatially scalable coding is performed in at least two layers, where one of the layers has a smaller resolution, typically referred to as the base layer, than the other layer, typically referred to as the enhancement layer. After decoding the base layer, the enhancement layer data can, in addition to be predicted from previous enhancement layer pictures, be predicted from pixel data or other data (such as motion vectors) of the base layer through up-sampling/interpolation. The high-resolution representation is thus depending on the low resolution. This dependency helps in many cases to achieve better coding efficiency than coding the resolutions separately. Thus, scalable coding is in general more bandwidth efficient than simulcast in the uplink. However the dependency causes a significant loss in coding efficiency for the highest resolution compared to single layer coding at that highest resolution, because to enable decoding of the high resolution video the decoder must receive both base layer and enhancement layer. Thus, compared to simulcast, scalable coding is less efficient in utilizing downlink bandwidth. This is one reason for the limited success of the scalable coding extension of H.264/AVC, called SVC. Recently, development of a scalable coding extension of H.265/HEVC has been started, called SHVC. Compared to the respective non-scalable coding scheme they are based on, SVC and SHVC have similar performance. The average loss in coding efficiency over non-scalable coding for spatial scalability (for common conditions in the standardization) compared to HEVC at high resolution is for all intra 11.5%, random access 17.5%, low delay B 27% and for low delay P 25%.

In SHVC the coded layer with low resolution (base layer) can be re-used by two methods of inter-layer prediction to improve the coding efficiency of the high resolution (enhancement layer). One method is to up-sample regions of pixel data of the high resolution from the low resolution. The other method is to re-use motion information from the low-resolution video for prediction of motion information for some regions of the high-resolution video.

In the so-called reference index (refIdx) approach considered in the SHVC development, the inter-layer pixel prediction is done by inserting an additional, up-sampled, reference picture into the reference picture buffer of the enhancement layer. The additional reference picture consists of the low-resolution layer up-sampled to the resolution of the high-resolution layer. The re-use of motion information from the encoded low-resolution layer is done by up-scaling motion vectors from the low-resolution layer and using them for prediction using a "temporal motion vector prediction" method (TMVP) as specified in HEVC.

One approach to deal with the significant loss in coding efficiency for the high resolution with scalable coding is to jointly optimize the coding of the layers so that the small resolution is used more efficiently when encoding the high-resolution. This allows trading the compression efficiency of low and high-resolution video representations against each other.

Another approach to deal with the significant loss in coding efficiency for the high resolution with scalable coding is to omit coding the low-resolution video and instead only encode the high-resolution video with a single layer codec and then use transcoding as adaptation method when a low-resolution bitstream is required. In transcoding, the high-resolution video is decoded and down-sampled to be used as the source to be coded in low resolution. In the transcoding approach, typically conventional non-scalable encoding is used in the encoder and the encoder uses high resolution and quality settings, e.g. the highest quality that could be requested by the receivers. In the adaptation node, the compressed video bitstream is converted (transcoded) into another compressed video bitstream. The simplest way of doing that is to decode the compressed video to obtain the uncompressed video frames (pixel data) and then re-encode the pixel data using the desired encoder settings, see FIG. 2 (which depicts an example of an adaptation node). Since the sender sends only the highest resolution video in this case, transcoding is efficient in terms of uplink bandwidth utilization. Since the video can be transcoded considering the receiver capabilities, transcoding is also efficient in terms of downlink bandwidth utilization, although the fact that an already compressed, and thus potentially distorted, video signal is used as input to the encoding step during the adaptation may lead to some inefficiency in the downlink bandwidth utilization when transcoded video representations are forwarded. Transcoding is computationally demanding in the adaptation node, specifically because the encoding step in the transcoder is complex. An alternative is to use low-complex encoding in the transcoding step, however that would have a significant negative impact on the compression efficiency, and thus be a significant drawback in terms of downlink bandwidth utilization, which is typically undesired.

Figure 2:
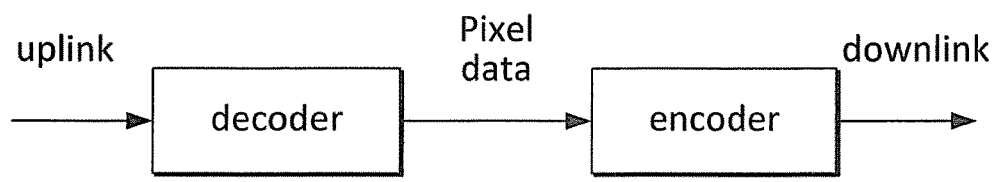
FIG. 2 is an illustration of a known transcoding scheme.
Figure 3:
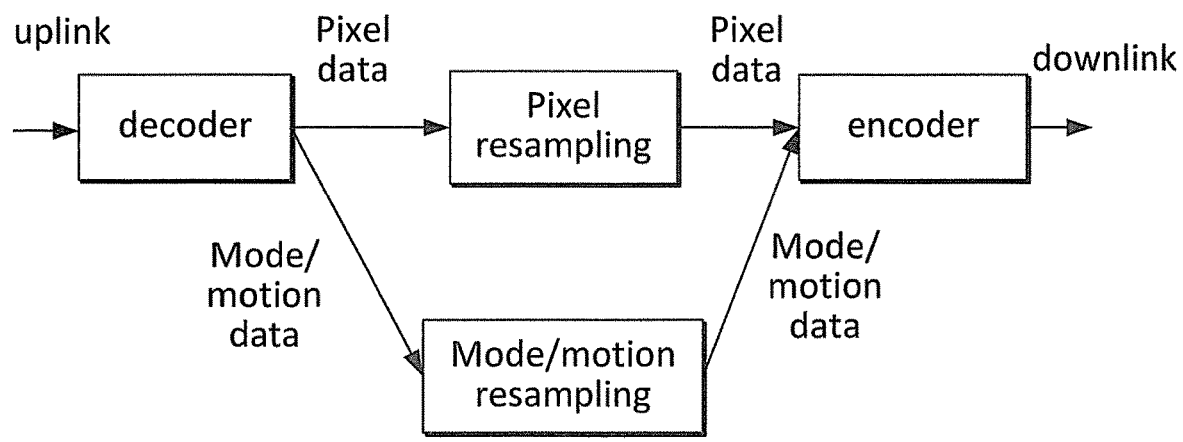
FIG. 3 is an illustration of a known transcoding scheme.

Advanced transcoding methods use data available in the uplink bitstream, such as information about coding modes and motion vectors used in the uplink bitstream, in order to speed-up the encoding step. This is shown in FIG. 3 (which depicts an example of an adaptation node). Note that compared to FIG. 2, FIG. 3 shows also the pixel resampling step that may be needed in order to change video resolution or frame rate (that step has been omitted in FIG. 2 for simplicity). Accordingly, mode and motion data may be resampled, too. The re-use of mode and motion data can reduce the complexity of the transcoding, however in order to achieve good utilization of the downlink capacity, it is still necessary to spend high complexity in the encoding step of the transcoder.

The above-described different available schemes are compared in the following table, Table 1. Note that the information is somewhat simplified.

TABLE 1

Comparison of known schemes

| | Simulcast | Scalable coding | Transcoding |
|---|---|---|---|
| Encoding complexity | High (several bitstreams) | High (slightly higher than simulcast) | Low (only one bitstream) |
| Uplink bandwidth utilization | Bad (several bitstreams) | Medium (representations jointly encoded) | Good (only highest quality sent) |
| Adaptation complexity | Low (bitstream selection) | Low (bitstream selection) | Very high (decoding + encoding) |
| Downlink bandwidth utilization | Good | Medium (compression efficiency loss over non-scalable coding) | Medium/good (compression efficiency loss through transcoding) |
| Decoding complexity | Low (non-scalable decoding) | Medium (multi-layer decoding needs to be done) | Low (non-scalable decoding) |

As has been described, all the mentioned schemes have their individual benefits and disadvantages. Consequently, the inventors have identified the potential benefits of reducing the complexity of the transcoding step in order to optimize the use of downlink and uplink resources as compared to known technology.

In a general embodiment, transcoding or adaptation is performed based on both a received video bitstream and received side information. The side information can be utilized to guide the transcoding process in order to reduce the computational complexity of the transcoding process and to optimize both the downlink and uplink resources.

Figure 4:
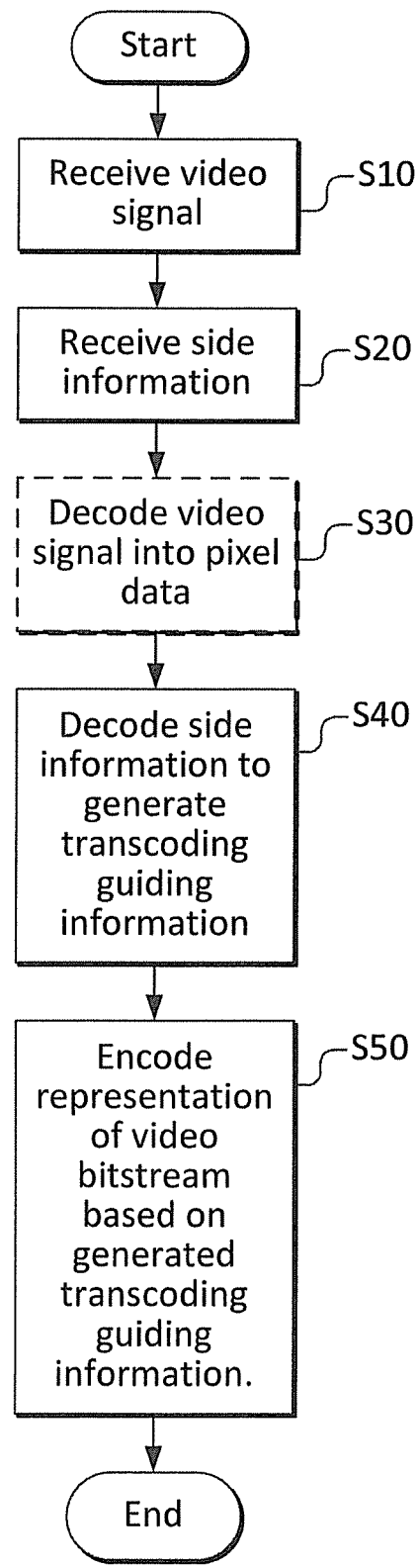
FIG. 4 is a flow chart illustrating embodiments of method steps.

With reference to FIG. 4, a schematic flow chart of an embodiment of a transcoding method in a transcoder arrangement 100 according to the proposed technology will be described. Initially, in step S10, a video input signal or bitstream is received at an intermediate node e.g. an adaptation node or transcoding node. The node can also comprise a base station node or a user equipment. The input video signal has a predetermined first video format. In a subsequent or parallel step, in step S20, side information relating to the received video input signal is received. The side information can comprise at least one of mode, motion, or in-loop filter information relating to one or more representations of the video bitstream. As an example the side information can comprise mode or motion or in-loop filter information relating to at least one other predetermined video format for the video bitstream. The received side information is decoded and utilized to generate, in step S40, transcoding guiding information, the meaning of which will be described and exemplified further below. Finally, a representation of the received video bitstream is encoded, in step S50, into a transcoded video bitstream with a predetermined output video format based on at least the generated transcoding guiding information. The output video signal has a predetermined output video format, which can be the same as the input video signal or different from the input video signal.

In an optional step S30 the received video bitstream is decoded into pixel data to provide the representation of the received video bitstream.

According to a particular embodiment, a basic idea is to send a high quality video representation typically encoded with non-scalable video encoding (as in the transcoding solution) and to additionally send side information that is utilized in the adaptation process. The side information is such that it allows the adaptation process to be performed with lower complexity than with transcoding without side information while still providing high compression efficiency. Thus good downlink bandwidth utilization can be achieved. The output of the adaptation process is a non-scalable video bitstream. Thus decoding of the bitstream from the adaptation process can be done with a low-complex non-scalable decoder.

Two particular embodiments can be described as follows:
1. The side information contains one or more low quality (lower than the main "high quality video" sent on the uplink) representations, compressed with dependency on the high quality video. The concept of dependent coding is similar to scalable coding; however instead of predicting higher quality video from lower quality video as in typical scalable coding, lower quality video is predicted from higher quality video. In the adaptation process, if the higher quality video is requested to be sent to the receiver, the main "high quality video" stream can be forwarded, and no further processing is needed. If the lower quality video is requested, either both high and low quality video streams are forwarded (allowing the receiver to decode the low quality video resolving the dependencies from the high quality video), or the high quality video stream is forwarded (requiring the receiver to downsample after decoding), or the low quality video is transcoded to a non-scalable compression format in the adaptation node, and the transcoded video is forwarded.
2. The side information contains information that guides a transcoding process in the adaptation node. An example is a partially coded low resolution video representation that e.g. contains only mode/motion information, but no transform coefficient data. The mode/motion information is used in the transcoding process, thus reducing its complexity significantly.

The proposed technology is described with a focus on spatial scalability (where different layers, or operating points, in the scalable bitstream would have different video resolutions) but it could equally well be used for other types of scalability as well. One other example is SNR scalability where the resolution is same but the quality differs in the operating points. Other examples of scalability where the proposed technology could beneficially be implemented concerns color gamut scalability where transcoding is performed between two color representations, and codec scalability where transcoding is performed from one codec e.g. HEVC/AVC to another codec e.g. AVC/HEVC.

The side information decoding step S40 can, according to a particular embodiment, comprise decoding the received side information based on at least one of mode or motion information or in-loop filter information received in the video bitstream, and the encoding step S50 comprises encoding the representation of the received video bitstream based at least on at least one of the decoded mode or motion or in-loop filter information. The mode or motion or in-loop information can, according to a further embodiment, be down sampled prior to decoding, and the encoding step S50 is subsequently based on the down sampled mode, motion, or in-loop filter information.

In order for the transcoder or transcoding arrangement to 100 optimize its transcoding operation according to the proposed technology, the input video and the side information needs to be properly generated and provided by e.g. a video provider arrangement 200. Embodiments of methods in such an arrangement 200 will be described with reference to FIG. 5.

Initially in step S100, a provided video signal or video bitstream is encoded with a predetermined video format, and in step S200 side information relating to the encoded video signal and potentially to at least one other predetermined video format for the video bitstream is generated. The side information can include at least one of mode, motion, or in-loop filter information for at least one other predetermined video format or representation for the video bitstream. The generated side information can be used to enable transcoding of the provided video bitstream in a transcoder arrangement 100 according to the previously described embodiments by supporting generation of transcoding guiding information in the transcoding arrangement. Finally, in step S300, the encoded video bitstream and the generated side information are transmitted to a sink e.g. network node or user equipment.

Figure 5:
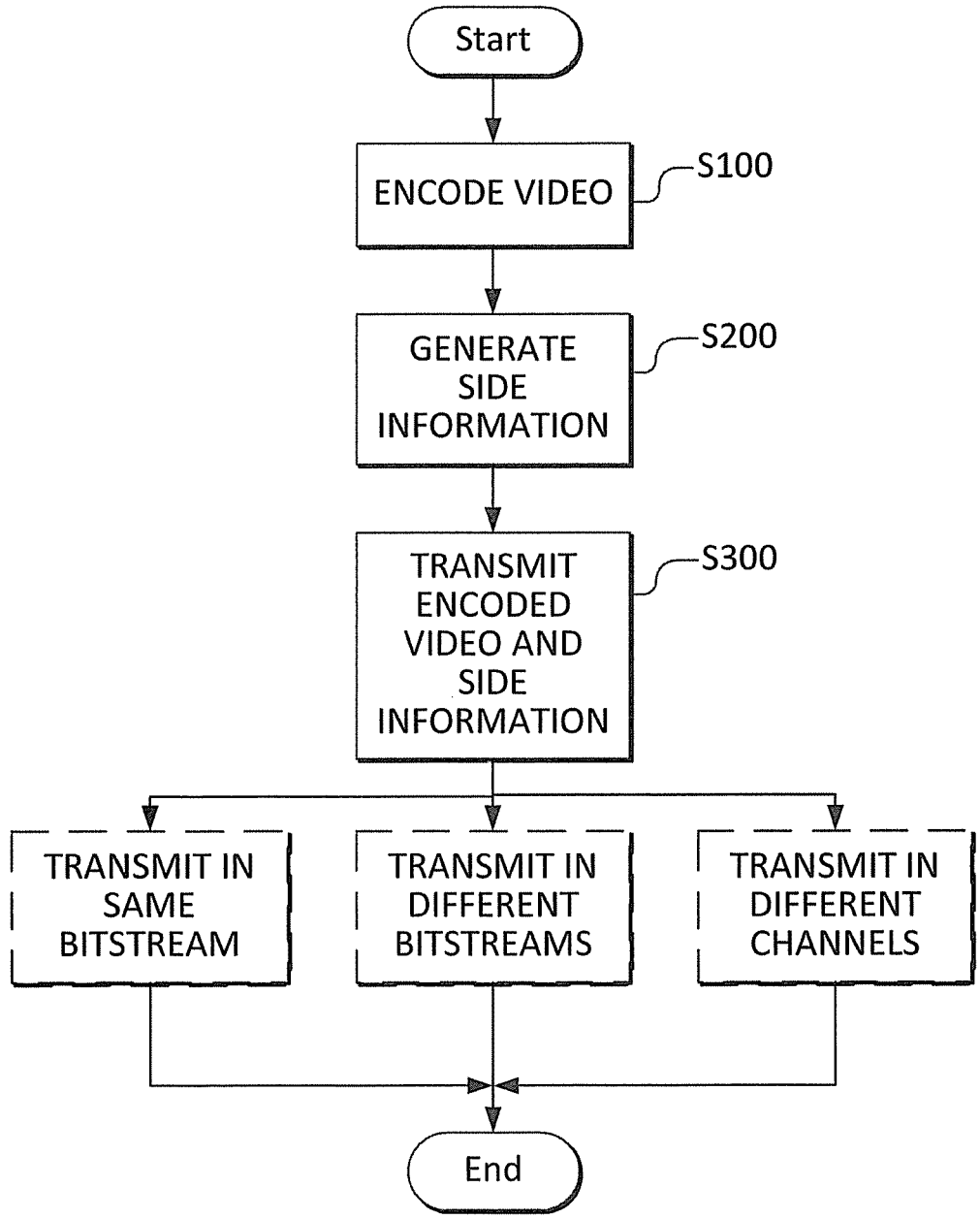
FIG. 5 is a flow chart illustrating further embodiments of the proposed technology.

The side information and the encoded video bitstream can be transmitted S30 together as an interleaved bitstream, or in separate layers within a single carrier, or in separate carriers or channels, as illustrated in FIG. 5. In order to enable a receiving transcoding node to utilize the provided side information, optionally an indication of the provided side information as well as optionally an indication of the potential use of the provided side information can be transmitted to the transcoding node.

The side information can, according to one embodiment, be provided as one layer of a scalable video bitstream in which one high fidelity layer comprises the main video and one or more low fidelity layers comprise the side information. In this case an indication can be provided in the scalable video bitstream that one or several layers has transcoding dependency with the first layer. The indication can be defined in the video parameter set (VPS) and/or in a SEI message in the beginning of the bitstream or in a separate channel. Another alternative is to provide the side information in a separate video bitstream e.g. HEVC in addition to a single layer bitstream e.g. HEVC. Each bitstream can in that case include a SEI message in the beginning of the bit streams that indicate what it can be used for or have the indication in a separate channel. In a further embodiment the side information is provided in a separate channel altogether.

For some occasions, it is necessary to provide the transcoder arrangement 100 with information concerning the encoding process of the video provider arrangement 200. One such particular case could be the input video having a high resolution and the output video having a low resolution. In that case, also information concerning any down-sampling process in the transcoder needs to be provided in the side information or in some predetermined specification. In particular, it might be necessary to provide information enabling the transcoder to e.g. properly down sample high resolution pixel data to low resolution pixel data.

Other information that can be provided in the side information is indications on which version or type of encoder 210 used in the video provider arrangement 200. If residuals are included in the side information, then the side information could additionally comprise indications on which transforms are used, which scaling etc. Other information included in the side information could include use or non-use of RDOQ in the encoder, error criteria used in the selection of coding parameters e.g. SAD, SSD, SSIM etc.

In some cases, the side information could contain a complete bitstream or a layer of a bitstream. In such a case an indication is provided in the video provider arrangement 200, which indication guides the transcoder arrangement 100 to which parts of the provided bitstream it should modify. As an example, a residual may be coded in a simple manner to reduce the overhead in the uplink. When the transcoder rewrites the bitstream it should re-use everything but the residual. Another example is that the side information could contain alternative in-loop filter parameters that could be used to further optimize the bitstream. In such a case the transcoder only needs to reuse everything in the video bitstream with exception to the SAO parameters provided in the side information.

Additionally, the video provider arrangement 200 could be adapted for providing an indication about a suggested encoding strategy for the transcoder arrangement 100, e.g. send side information to indicate which mode, motion, or in-loop filter search strategy it should apply, which quantization strategy it should apply and how to apply it.

These are only a few of the possible types of guiding information that can be generated or provided in the side information sent to a transcoder arrangement 100.

The side information can be transmitted S300 in a plurality of different ways, including as at least one SEI message, encapsulating mode/motion information, as auxiliary picture in the video bitstream, as a scalable layer with a different layer-id than the main video.

Below will follow descriptions of a plurality of embodiments of the transcoding method of the proposed technology.

Figure 6:
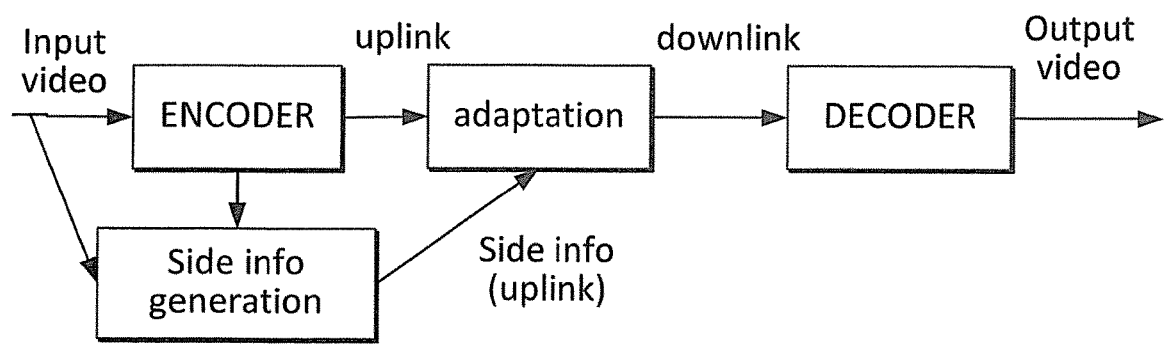
FIG. 6 illustrates further embodiments of the proposed technology

With reference to FIG. 6, an embodiment of the proposed technology when applied to an adaptation node is disclosed. In a corresponding manner to transcoding, a video bitstream is encoded in an encoder and side information pertaining to the video bitstream is generated. Both the encoded video bitstream and the generated side information are transmitted over the uplink to an adaptation node in which the video bitstream is adapted. The adapted video bitstream is subsequently transmitted over the downlink and received in a decoder where it is decoded into an output video bitstream.

FIG. 6 shows the general block diagram of the proposed system when applied to an adaptation process. The encoder is typically a non-scalable video encoder, such as a HEVC Main profile encoder. Additionally, side information is generated S200, based on input from the input video and from the encoder.

The generated side information is sent S300 in addition to the main encoded video bitstream, i.e. through the uplink. The bit rate used for the transmission of side information is typically much lower than the bit rate of the main video data, e.g. in the order of 10% of the main video data (see below for a more detailed performance discussion). The side information may be transmitted S300 separately from the main video data, e.g. through a different physical or logical channel. However, typically the side information is transmitted interleaved with the main video data. One way of sending the side information is to use HEVC supplemental enhancement information messages (SEI) interleaved in the main bitstream. Another way is to use other HEVC NAL units (network adaptation layer), that may be distinguished from the main bitstream e.g. by the value of nuh_layer_id in the NAL unit header, similar to how scalable video layers are distinguished in SHVC.

The side information is provided S300 to the adaptation node, in addition to the main video data, and then utilized S40 by the adaptation node in the adaptation process.

Figure 7:
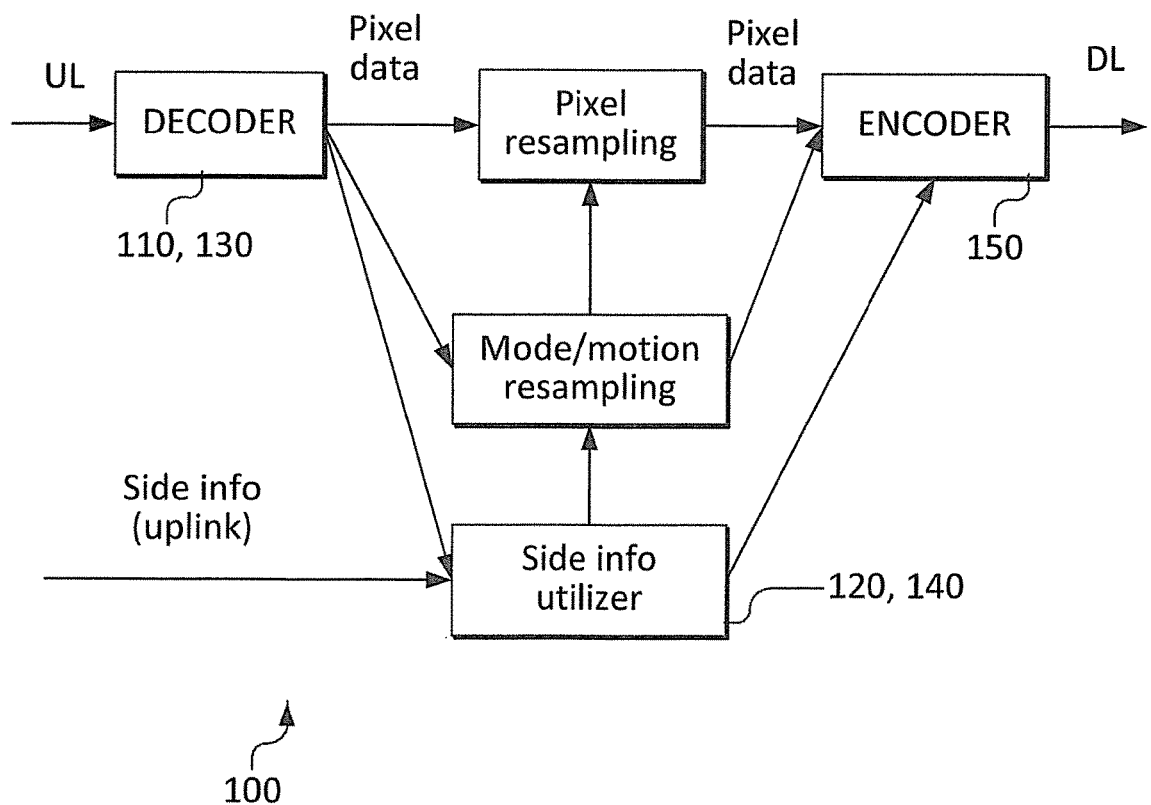
FIG. 7 illustrates further embodiments of the proposed technology.

With reference to FIG. 7, an embodiment of a transcoding method and arrangement of the proposed technology using side information to control transcoding with mode/motion re-use will be described.

FIG. 7 shows the transcoding node 100 according to a particular embodiment which extends the transcoding solution depicted in FIG. 3. Here the decoder 110, 130 is typically a non-scalable decoder, e.g. HEVC Main profile decoder. The side information is fed into a "side information utilizer" 120, 140. The side information utilizer 120, 140 can optionally receive data from the decoder 110, 130. Optionally, the side information utilizer 120, 140, based on the side information received S20, controls the pixel resampling and mode/motion resampling processes in the transcoding process. Here and in the following, mode/motion information may comprise information such as block partitioning structure, CU (coding unit) partitioning structure, prediction mode (inter-coded or intra coded), PU (prediction unit) partitioning structure, TU (transform unit) partitioning structure, intra prediction directions, and motion vectors. Alternatively or additionally, the side information utilizer 120, 140 provides input to the encoding process and/or controls the encoding process. The particular operations in the side info generator depend on the video resolutions that are requested (not illustrated in 7), e.g. by the receiving device or devices. For instance, if a certain representation of the video is requested, then the side information utilizer 120, 140 controls the pixel resampling, mode/motion resampling and encoder 150 such that that particular representation is generated by the encoder 150. The side information generation (not depicted in FIG. 7) generates the commands used by the side info utilizer 120, 140.

Figure 8:
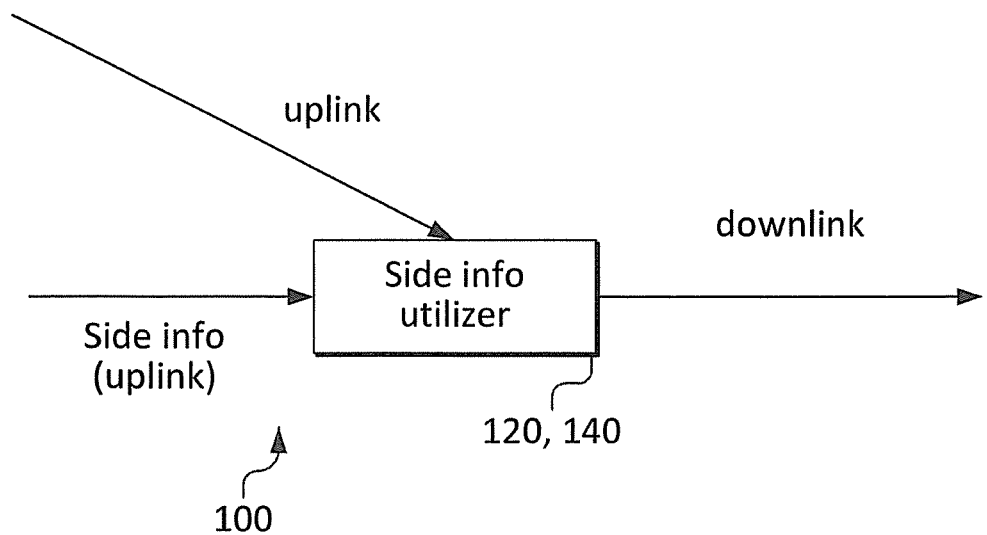
FIG. 8 illustrates an additional embodiment of the proposed technology.

With reference to FIG. 8, a further embodiment of an adaptation or transcoding method and arrangement according to the proposed technology, in which video adaptation with side information is performed including low quality video will be described.

FIG. 8 shows the adaptation node 100 according to another particular embodiment, which is a particular example of the embodiment described with reference to FIG. 7. Here, the side information utilizer 120, 140 receives S10 the non-scalable main video bitstream (through the arrow marked as "uplink") as well as the side information S20 (through the arrow marked as "side info (uplink)"). The side information could for example be a video encoded at low resolution, i.e. lower than the main video. The low-resolution video is either coded with dependency on the high-resolution video, or it is coded using a non-scalable video scheme. If the high-resolution video is requested, then the side information utilizer forwards only the video bitstream received through the "uplink" channel, i.e. the non-scalable main video bitstream. If the low-resolution video is requested and the side information is coded independent from the main video bitstream, then only the side information is forwarded. If the low-resolution video is requested and the side information is coded dependently from the main video bitstream, then either main bitstream and side info are forwarded, or the side info is at least partly decoded (with the help from the main video bitstream) and then re-encoded. If, as in this example, the side information contains coded video data, which is either dependent on the main video bitstream or not, then the side info generation depicted in FIG. 3 would contain a video encoder.

Figure 9:
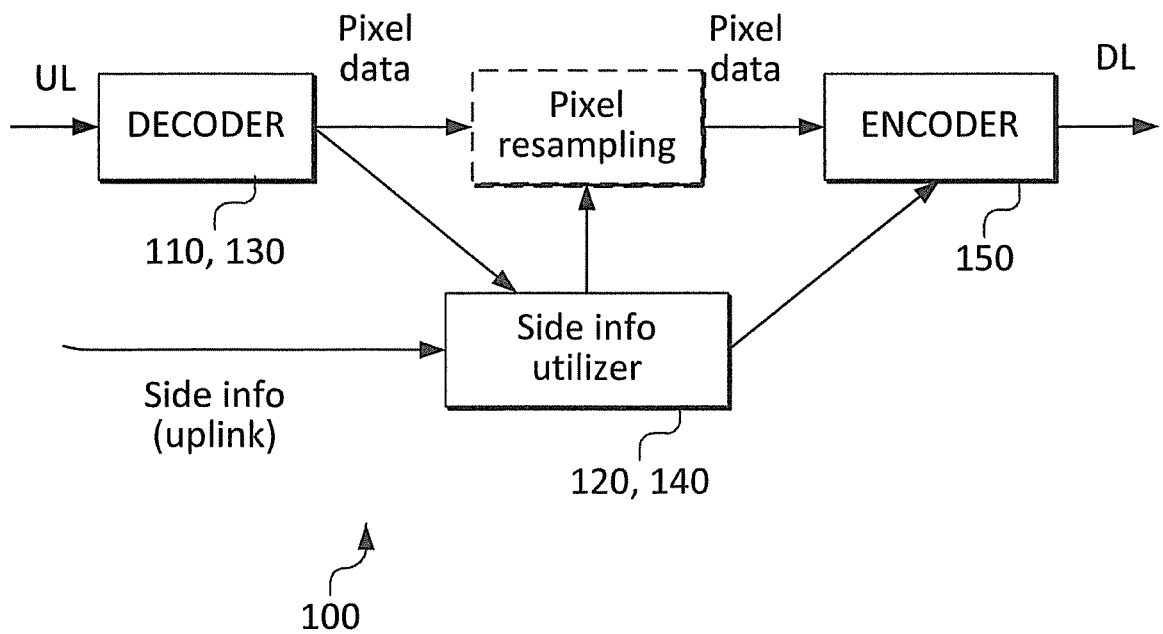
FIG. 9 illustrates an additional embodiment of the proposed technology.

With reference to FIG. 9, a further embodiment of an adaptation or transcoding method and arrangement with transcoding guided by side information according to the proposed technology will be described.

FIG. 9 shows the adaptation or transcoding arrangement 100 according to another particular embodiment, which is a particular example of an embodiment. In this embodiment, the decoder 110, 130 may receive S10 a compressed video coded with a non-scalable video scheme such as HEVC Main profile, the video having high resolution. The decoder 110, 130 decodes S30 the compressed video into pixel data. The pixel data is then resampled to the target resolution, as determined by the side information utilizer 120, 140, based on the received S20 side information comprising resolution and/or quality requested e.g. by the receiving device or devices.

The side information may contain compressed mode/motion information. The compressed mode/motion information may be coded with dependency on the mode/motion information in the main video. In that case, the side information utilizer 120, 140 may decode the side information with dependency on the mode/motion information in the main video data. Decoding S40 the side information with dependency on the main video data may involve resampling or sub-sampling of the mode/motion information in the main video data. To that effect, operations similar to the operations in SHVC (when spatial scalability is used) may be utilized, however contrary to SHVC, the "source" (or reference) mode/motion information would be associated with a high resolution video, and the "target" (or predicted) mode/motion information would be associated with a low resolution video. Further contrary to SHVC, no "residual data" (transform coefficients) may be provided.

The side information utilizer 120, 140 provides the decoded mode/motion information to the encoder 150, which utilizes that information in the encoding process S50. The encoder may utilize the provided mode/motion information "as is" in the encoding process, thus replacing the mode/motion estimation stage typically found in encoders. Alternatively, the provided mode/motion information may be interpreted by the encoder 150 as hints that determine the operation of the mode/motion estimation stage in the encoder 150. For example, a range of block partitionings (e.g. CU, PU, TU) or a motion vector search range could be indicated, according to which the mode/motion operation would be performed.

Another example of utilizing the proposed technology is for the case of scalable video coding with prediction from high resolution to low resolution.

This embodiment exemplifies the use of scalable representations where the bottom layer (base layer) is representing the highest resolution and the following layers (enhancement layers) represent one or more lower resolutions. Such scheme could be utilized for dependent coding of side information as exemplified in the embodiments in FIG. 8 and FIG. 9.

A flag in the bitstream could indicate if inter-layer prediction is performed by up-sampling or by down-sampling. Alternatively, the image resolution of both base and enhancement layer could be transmitted e.g. in one or more parameter sets such as picture parameter sets (PPS), sequence parameter sets (SPS) or video parameter sets (VPS), and based on the relation of base and enhancement layer image resolutions, it could be inferred whether up-sampling or down-sampling would be utilized. Down-sampling can include down-sampling parts of the reconstructed samples from the base layer, down-scaling parts of the motion vectors from the base layer or down sampling parts of the residual from the base layer.

Additional flag(s) can indicate if inter-layer prediction is performed by down-sampling pixel values or motion vectors. For example, one flag could indicate whether inter-layer pixel prediction is used, and one flag could indicate whether inter-layer mode/motion information is used.

Down-sampling consist of reducing the number of samples from a higher resolution to a lower resolution. Low-pass filtering is preferably performed before down-sampling to avoid aliasing.

Down-scaling of motion vectors consists of scaling the motion vectors according to the ratio between the low and high resolution. Consider a ratio of 2 (both horizontally and vertically) and that the motion is 2 horizontally and 1 vertically in high resolution. Then the down-scaled motion is $2/2=1$ horizontally and $½=0.5$ vertically.

One example of how to achieve inter-layer prediction with down-sampling of high resolution samples is to include one or more down-sampled picture as reference pictures in the reference picture buffer of the low resolution layer. When a region in the low resolution layer wants to use a down-sampled area for prediction it just uses the corresponding reference index with a zero motion vector.

One example of how to achieve inter-layer motion prediction is to store the down-scaled mode/motion information from the base layer as the temporally collocated picture, i.e. using TMVP mechanisms.

In other words, the embodiment includes a situation in which the predetermined input video format has a high resolution and the predetermined output video format has a low resolution, and wherein the video decoding step S30 comprises decoding a high resolution layer of the video bitstream to obtain high resolution pixel data and down sampling the high resolution pixel data to a desired low resolution. Subsequently, the side information decoding step S40 comprises decoding the mode and/or motion data for the desired low resolution, and the encoding step S50 comprises encoding the down sampled pixel data based on the decoded low resolution mode and/or motion data.

For an embodiment having a same video resolution for the output and input video formats, the video decoding step S30 comprises decoding the video bitstream to obtain high fidelity pixel data, and the side information decoding step S40 comprises decoding the mode and/or motion data for the desired low fidelity bitstream, and the encoding step S50 comprises encoding the high fidelity pixel data based on the decode low fidelity mode and/or motion data.

Figure 10:
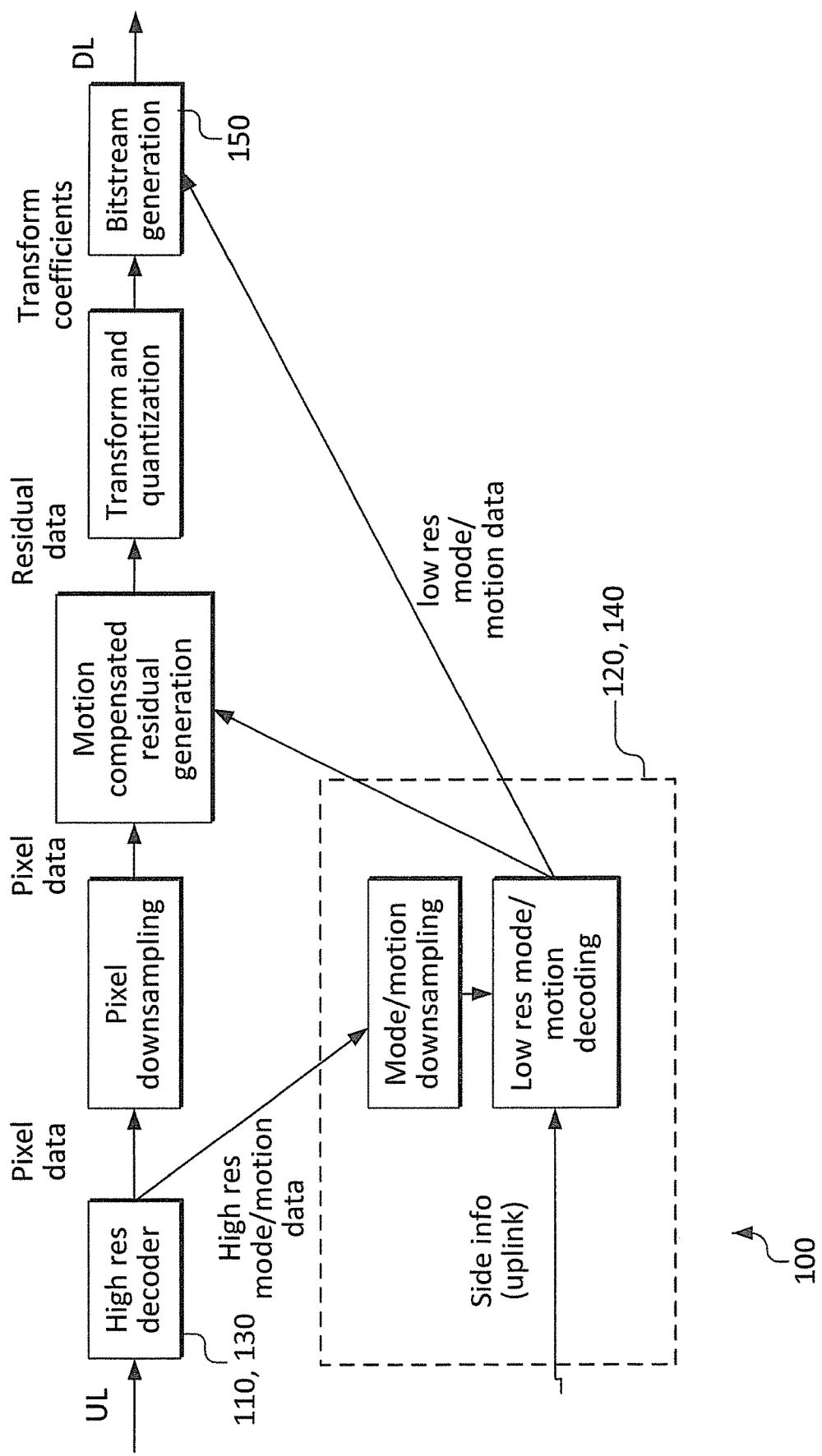
FIG. 10 illustrates an additional embodiment the proposed technology.

With reference to FIG. 10, a further embodiment of a transcoding method and arrangement for scalable video coding with prediction of mode/motion data from high resolution to low resolution will be described.

This embodiment exemplifies the use of a scalable representation where the bottom layer (base layer) is representing the highest resolution and the following layers (enhancement layers) represent one or more lower resolutions. The layers representing the lower resolutions may utilize inter-layer mode/motion prediction with resampling similar to a previously described embodiment in order to reduce the number of bits spent for coding mode/motion information. If no inter-layer prediction is used this embodiment is similarly applicable for the case of having a low resolution in the base layer and highest resolutions in one of the enhancement layers.

In one variant of this embodiment, data for representing prediction residual data (or transform coefficient data) is only provided for the layer that represents the highest resolution; all other layers (i.e. those layers representing lower resolutions) do not contain such residual data. All other mode/motion and partitioning information is present for all layers, only the coefficients are not present for layers with smaller resolutions. The coefficients are not present for the smaller resolutions in order to reduce the size of the scalable bitstream. A flag in the bitstream may indicate that the residual is missing for all layers but the layer with highest resolution. Alternatively, it can be indicated separately for each layer whether it contains any residual. The missing residual in respective layer is re-generated by computing the difference between the down-sampled final reconstructed pixels for the high fidelity layer and the prediction in a low fidelity layer. The difference is then transformed and quantized after which the normal decoding processes applies.

A transcoder, e.g. according to FIG. 9, can then use this information to speed up transcoding to one of the lower resolutions partly coded in the scalable bitstream, as follows:

The corresponding architecture is illustrated in 10. The transcoder 10 decodes S30 the high-resolution layer to obtain the high-resolution pixel data, and then down samples those high-resolution pixel data to the desired low resolution. It further decodes S40 the mode/motion data for the desired low resolution, optionally using the down sampled mode/motion data from the high resolution as a prediction reference. Then it utilizes the decoded low-resolution mode/motion data to encode S50 the down sampled pixel data (involving motion-compensated residual generation, transform, quantization and entropy encoding), and it generates an output bitstream according to a single layer video coding specification such as HEVC Main profile, containing the low resolution mode/motion information and the quantized and transformed residual data after applying the low resolution mode/motion information on the down sampled high resolution pixel data. Note that although not indicated here, the side info utilizer 120, 140 in this example could also control the transform and quantization stage.

Referring to FIG. 6, the mode/motion information for the low resolution representations is generated in the side info generation, which has similar architecture as a single layer encoder such as a HEVC Main profile encoder (in case the mode/motion information is coded independent of the high resolution mode/motion information) or a scalable encoder such as a SHVC encoder (in case the mode/motion information is coded dependent on the high resolution mode/motion information), and it may further include resampling or down-sampling operations to reduce a low resolution version of the input video. Techniques such as rate-distortion optimization (RDO) can be employed in the side info generation to optimize the side information with respect to the bit rate required to transmit it, and the bit rate and quality provided by the transcoded video bitstream that will be sent through the downlink. For the purpose of the RDO, the side information generation may simulate the transcoding operation in order to determine the bit rate and quality of the resulting transcoded bitstream.

In other words, compared to the simple transcoder shown in FIG. 2, the mode/motion information for low resolutions is generated at the sender side and transmitted to the transcoder arrangement 100, where it is fed into the encoder stage, replacing the mode/motion estimation in the encoder stage 150 of the transcoder arrangement 100.

In order for the side info generation to perform efficient RDO, it needs to have exact knowledge of the operations performed in the adaptation node, e.g. filters used for pixel and/or motion resampling, and operations performed in the encoder stage of the transcoder (motion-compensated reconstruction including motion compensated prediction, intra prediction, transform, quantization, reconstruction, loop filtering, etc.), i.e. how the side information is actually applied in the encoder stage of the transcoder. One option for the side information generation to have that knowledge is that the side information generation and transcoder would be provided as a "closed solution", i.e. by a single vendor providing the complete solution. Another option would be that some or all of the operation of the transcoder would be standardized in a standard specification, such as an appendix to the HEVC specification.

As an example using HEVC, the embodiment can be performed by an encoder by the following steps:
1. The encoder or another entity uses down sampling to construct pictures of lower resolutions. The down sampling method needs to be agreed between encoder and adaptation node, preferably standardized.
2. The encoder encodes the highest resolution picture and outputs a bitstream that is compliant to the HEVC video coding standard. The block structure, block modes, intra modes, motion vectors, and reference pictures used for motion compensation are stored.
3. The encoder encodes each picture of lower resolution by deciding on block structure and performing motion estimation and mode selection for all the blocks in the picture. Side information is generated that may include the following:
    a. Block partition sizes for coding units (CUs), prediction units (PUs), and transform units (TUs). These may be encoded with or without predicting the sizes from a higher resolution pictures. For instance, if the higher resolution choses a 64×64 coding unit for a particular block and the lower resolution is 2× smaller, resolutions 32×32 and 64×64 are made cheaper than other block sizes as they are expected to be more likely to occur for the corresponding picture area. Likewise, if the transform size is 8×8, the transform sizes 8×8 and 4×4 are made cheaper than other transform sizes. This can for example be realized by including block sizes from the corresponding higher resolution into the CABAC context when coding the block sizes of the current resolution. Here and in this document, including certain information into the CABAC context is to be understood as selecting a CABAC context based on that information.

b. Block modes for the coding units. Again, they may be encoded with or without predicting from a higher layer. If predicted, the block mode of the corresponding picture area of a higher layer is used for predicting the mode of the current block. For instance, if the corresponding block(s) in the higher resolution picture is Intra coded, Intra mode is made cheaper for the lower resolution block. As with block sizes, the prediction can be realized by including co-located block modes into the CABAC context when coding the mode.

c. Intra prediction mode for the blocks whose mode is Intra, either predicted from higher quality layer or not, similar to what is described above.

d. Motion vector and reference picture for motion compensation for the blocks whose mode is Infra, either predicted from higher quality layer or not, similar to what is described above. Prediction of motion vectors can be realized by including information about the higher quality layer motion vectors into the CABAC context for coding the motion vectors in the lower quality layer, or prediction of motion vectors by means of predictive motion vector coding using techniques such as adaptive motion vector prediction (AMVP) or temporal motion vector prediction (TMVP), where a motion vector predictor would be derived based on the motion vectors in the higher quality layer, and when coding the lower quality layer motion vector, the difference between the actual lower quality vector and the motion vector predictor is coded.

e. Quantization parameter for all blocks f. SAO parameters for the picture, either predicted from higher quality layer or not, similar to what is described above.

The selection of side information a-f above can be performed by employing rate-distortion optimization (RDO) techniques. In such techniques, typically, the impact of coding mode or parameter decisions is evaluated by considering the impact of the decision on both the resulting video distortion after reconstructing the video (D) and the bit rate required for coding (R). Here, D is typically a function of the reconstructed video and the corresponding original (undistorted) video, e.g. a mean-square error (MSE) or signal-to-noise ratio (SNR) or peak-signal-to-noise ratio (PSNR). The impact of both D and R is typically considered by minimizing a cost function $D+lambda*R$, i.e. a weighted sum of distortion and bit rate, using a weighting factor lambda. The cost function is typically evaluated for several different parameter choices, and then the choice that minimizes the cost function is selected by the encoder. In the case of side information coding, the distortion $D_{transcoded}$ to consider is the distortion that would be observed after using the side information in the transcoding process and then decoding the transcoded video. Furthermore, two bit rates may be considered, the bit rate required to code the side information in the uplink (i.e. when sending the video from the encoder to the transcoder), $R_{sideinformation}$, and the bit rate required to represent the video after transcoding, $R_{transcoded}$. If the side information is coded independent of the high quality video, then the side information may be used as-is in the transcoded video, thus $R_{sideinformation}$ could be considered to have a direct linear contribution in $R_{transcoded}$, in which case $D_{transcoded}+lambda*R_{sideinformation}$ can be used as cost function. If the side information is coded with dependence on the high quality video, then no such relationship between $R_{sideinformation}$ and $R_{transcoded}$ may exist, and the two rates may be considered through separate terms in a cost function such as $D_{transcoded}+lambda_{sideinformation}*R_{sideinformation}+lambda_{transcoded}*R_{transcoded}$, using two weighting factors $lambda_{sideinformation}$ and $lambda_{transcoded}$.

4. The encoder reconstructs the lower resolution picture by using the sizes/modes/vectors/QP/SAO that was sent in the side information:

a. Constructing residual blocks by applying the block mode and either Intra prediction mode or motion vector and reference picture depending on whether the block is Intra or Inter.

b. Quantizing the residual blocks according to a known quantization method. Note that quantization methods are generally not standardized so this method needs to be agreed between encoder and adaptation node or standardized (preferred).

c. Inverse quantize the block, add it to the prediction and form the reconstructed block according to the HEVC specification.

d. Apply de-blocking filter and SAO for the picture. The reconstructed picture will now be bit-exact to what a decoder decoding the stream after the adaptation node will decode.

Following the same example, these steps may be performed by an adaptation node to generate a single layer low-resolution bitstream from the incoming high resolution bitstream and side information:

1. Decode the high-resolution bitstream. Store block structure, block modes, intra modes, motion vectors and reference pictures used for motion compensation.

2. The high-resolution picture is down sampled by using the agreed/standardized down sampling method.

3. The adaptation node decodes the block sizes, block modes, intra prediction modes, motion vectors, and reference pictures for motion compensation, quantization parameter, and SAO parameters from the side information bitstream. Note that some of all of these parameters may be predicted from parameters stored during decoding of the high-resolution bitstream. These decoded parameters are included in the output bitstream.

4. For each block, the block size, modes (including Intra and Inter modes and parameters), and QP are used to form residual blocks. These residual blocks are then quantized according to the known quantization method described above. The resulting coefficients are included in to the output bitstream.

5. Inverse quantize each block, add it to the prediction and form the reconstructed block according to the HEVC specification.

6. Apply de-blocking filter and SAO for the picture. The reconstructed picture will be bit-exact to the result of decoding the output stream. The output stream will be a compliant single layer HEVC stream.

The adaptation steps 4 and 5 above may have to be performed on a per-block level, such that when reconstruction a block in step 5, the result of the reconstruction process of previously decoded blocks in the same picture are taken into account. That is typically the case when intra-prediction modes are used, since those generate the prediction signal based on decoded pixels in the block neighborhood. It may be desirable to avoid such per-block processing since it may be simpler to re-use existing decoder implementations for implementing the new scheme when the decoding process is only affected on a picture level. This can be realized for a given picture when no intra predicted blocks are used. Alternatively, it can be realized when prediction for intra-predicted blocks based on reconstructed inter-predicted blocks is disabled, which is called "constrained intra prediction", and additionally, any prediction between intra-predicted blocks is avoided, e.g. by avoiding placing intra-coded blocks next to each other. An encoder has the choice to fulfill such constraints. However in order for the transcoder or decoder to make use of that fact, such as to perform only picture level processing, e.g. using existing transcoder or decoder implementations, the transcoder, or decoder needs to be aware that such constraints have been fulfilled by the encoder. Thus the encoder may signal that it has followed such constraints, e.g. by using a flag or indicator that indicates whether the constraints have been fulfilled or not. If the transcoder or decoder receives the flag and the flag indicates that the constraints have been fulfilled, it can perform picture-level processing or, alternatively, block-level processing. If the transcoder or decoder receives the flag and the flag indicates that the constraints have not been fulfilled, the transcoder or decoder can perform block-level processing, or if it does not support using block-level processing, it can indicate that it cannot decode the video.

An advantage with the guided transcoding architecture above is that compared to known transcoding architectures such as depicted in FIG. 2 or FIG. 3, the additional side information can provide optimized mode/motion information to the encoding stage of the transcoder such that very high compression efficiency can be achieved for the transcoded bitstream while the encoding stage in the transcoder does not have to include mode/motion estimation, which is typically the major reason for high transcoding complexity. It can be noted that since the side information generation is located at the sender side of the system, it can utilize original video data for generation of the low-resolution mode/motion information, unlike what conventional transcoders according to FIG. 2 or FIG. 3 could do since they have only the compressed bitstream available. Compared to conventional transcoding, the availability of original video data for utilization in mode/motion optimization allows the proposed system to achieve slightly better compression efficiency of the transcoded bitstream, i.e. a slightly better downlink bandwidth utilization.

Figure 11:
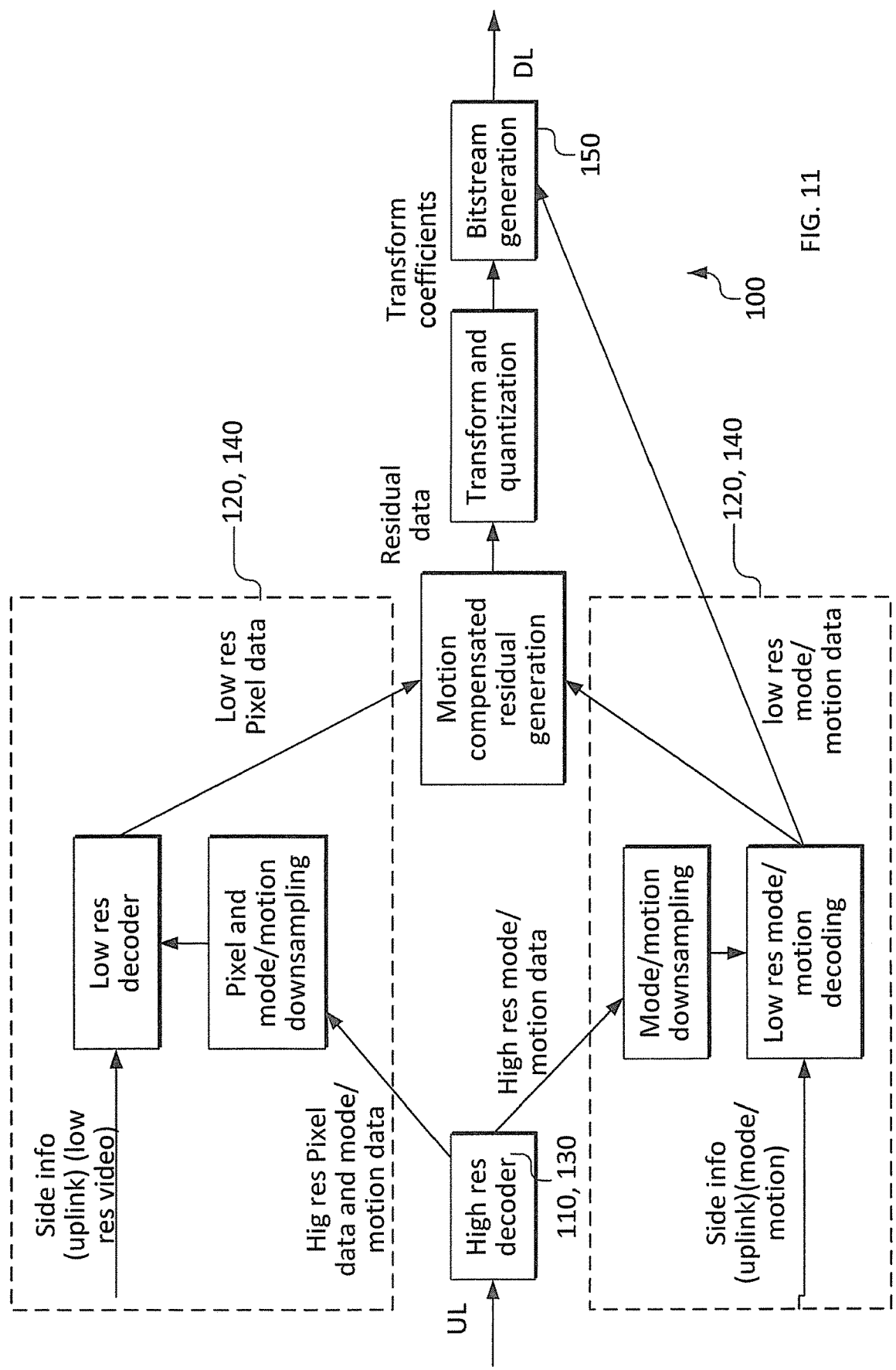
FIG. 11 illustrates an additional embodiment according to the proposed technology.

Yet another embodiment of the proposed technology for scalable video coding with prediction of pixel data from high resolution to low resolution, and utilization for transcoding will be described with reference to FIG. 11. In this embodiment, the arrangement includes two separate side information utilization units 120, 140, and the side information is consequently used for at least two different purposes. On one hand the side information is in the form of a low-resolution video bitstream and is used in a low-resolution decoder to generate low-resolution pixel data, on the other hand the side information comprises mode/motion information that is used to generate low-resolution mode/motion data.

This embodiment can be seen as a variation of the embodiment described with reference to FIG. 10 with respect to the side information transmitted and used in the transcoding. In FIG. 10, the side information comprises mode/motion information corresponding to the low-resolution video, and no coefficient information corresponding to the low-resolution video. Here, the side information comprises both mode/motion information and coefficient information for the low-resolution video, as illustrated in FIG. 11. Here, two kinds of side information are sent, mode/motion data (at the bottom of the figure), and low-resolution video data, which contains coefficient data and may contain mode/motion data (at the top of the figure). Both types of side information are preferably interleaved (not illustrated) in a single stream, e.g. using different NAL units distinguished by NAL unit type of layer identifier. The mode/motion information that is contained in the low resolution video bitstream illustrated at the top of the figure may or may not be identical to the mode/motion information that is contained in the side info illustrated at the bottom of the figure. If that motion information is not identical, they may be coded dependent on each other, in order to achieve higher compression efficiency.

The low-resolution coefficient data may contain prediction residual data as in conventional single layer video or scalable video. It may be coded with dependency on the down sampled high resolution pixel data, then using similar prediction mechanisms as in scalable coding (e.g. SHVC), with the difference that a down sampling operation is involved for inter-layer prediction. The "low res decoder" may reconstruct the low-resolution pixel data, e.g. using motion-compensated reconstruction mechanisms.

The output of the "low res decoder" is low-resolution pixel data. Together with the low-resolution mode/motion information, it is fed into the motion-compensated residual generation stage in the encoder stage 150 of the transcoder arrangement 100, which generates the low resolution residual data that is transformed, quantized and coded into the output bitstream.

Note that although not indicated in the figure, the side info utilizer 120, 140 in this example could also control the transform and quantization stage.

Another example of the multiple usage of the side information will be described with reference to FIG. 12, in which guided transcoding with side information is performed for residual refinement.

This embodiment is an extension of the embodiment in FIG. 10 with respect to the side information transmitted and used in the transcoding. In FIG. 10, the side information comprises mode/motion information corresponding to the low-resolution video, and no coefficient information comprising to the low-resolution video. Here, as illustrated in FIG. 12, the side information comprises both mode/motion information (illustrated at the bottom of FIG. 12) and coefficient information for the low-resolution video (illustrated at the top of FIG. 12). Both types of side information are preferably interleaved (not illustrated) in a single stream transmitted on the uplink, e.g. using different NAL units distinguished by NAL unit type of layer identifier.

Although illustrated as two separate side information inputs and two side information utilization units 120, 140, it is equally possible to have a single side information utilization unit 120, 140 enabling the reception of two separate side information bit streams interleaved into a single side information bit stream.

The low-resolution coefficient data may contain prediction residual data as in conventional single layer video or scalable video. It may be coded with dependency on the down-sampled high-resolution pixel data, then using similar prediction mechanisms as in scalable coding (e.g. SHVC), with the difference that a down-sampling operation is involved for inter-layer prediction. The output of the "residual decoder" is low-resolution residual data. The "residual decoder" may reconstruct the low-resolution residual data without performing motion-compensated reconstruction mechanisms.

The encoder stage of the transcoder comprises motion-compensated residual generation, followed by residual adjustment (the result being adjusted residual data), transform coefficients (the result being transform coefficients and bitstream generation). The motion-compensated residual generation uses main video pixel data down-sampled to the target resolution as input data, and the motion compensated residual generation is performed by utilizing the low-resolution mode/motion data received as side information (that data is optionally encoded dependent on the down-sampled mode/motion data from the main video). In the residual adjustment stage, the residual data generated in the motion-compensated residual generation is adjusted based on the low-resolution residual data decoded by the residual decoder. The residual adjustment operation could for example include adding the two residual signals, or subtracting them from each other. The resulting adjusted residual data is transformed, quantized, and entropy coded together with the low resolution mode/motion data.

Figure 12:
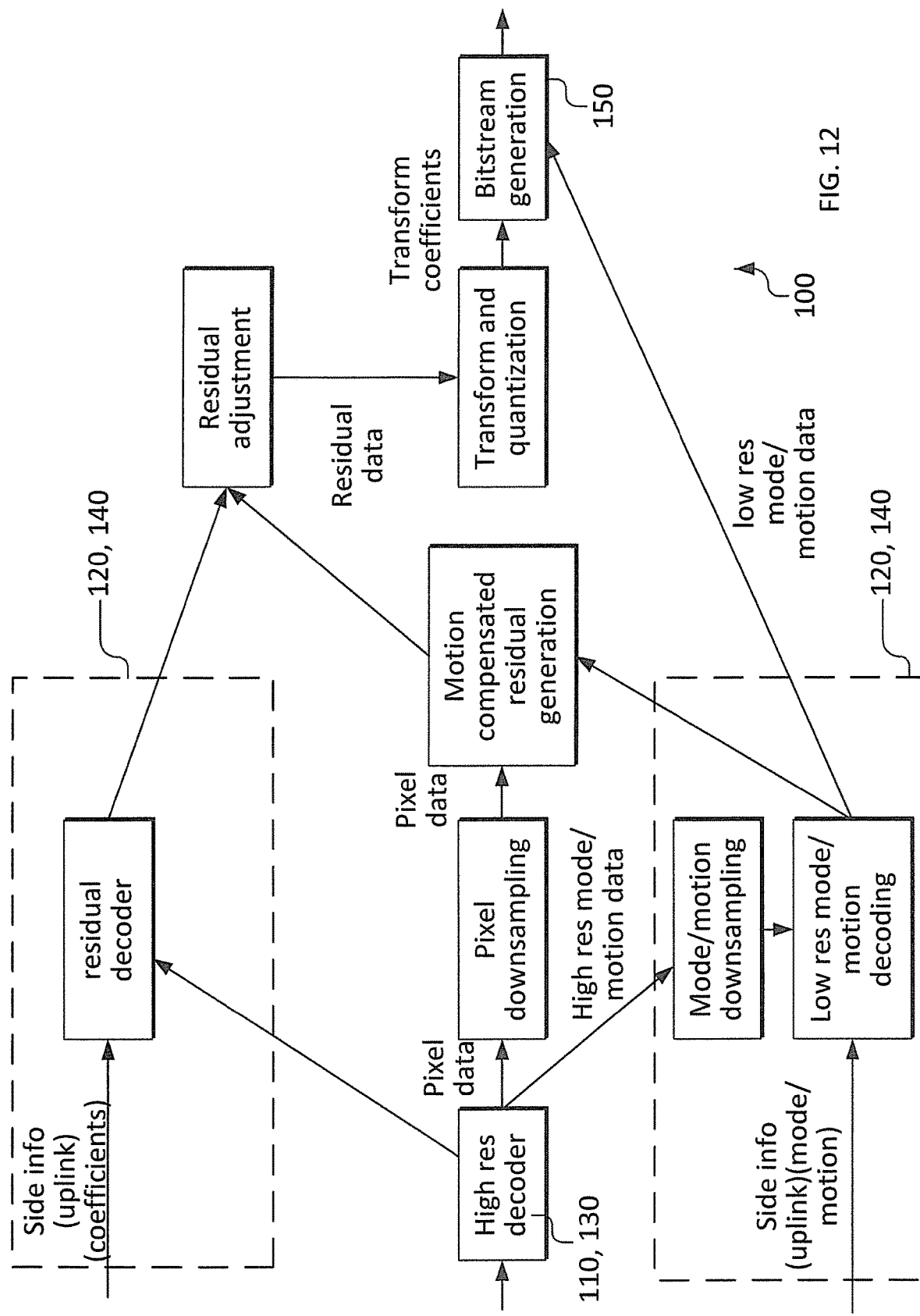
FIG. 12 illustrates an embodiment of an arrangement according to the proposed technology.

Note that alternatively to the example depicted in FIG. 12 adjustment operations similar to the residual adjustment operation could also be performed on the pixel data that is input to the motion-compensated residual generation or on the transform coefficients that are output from the transform and quantization stage.

Note that although not indicated in the figure, the side information utilizer in this example could also control the transform and quantization stage, and the residual adjustment stage.

As indicated above the side information can comprise residual information related to the predetermined input video format, as well as or alternatively search ranges of coding parameters to further enhance the transcoding. The side information and the encoded video bitstream can be transmitted together as an interleaved bitstream, or in separate layers within a single carrier, or in separate carriers or channels. In order to enable the receiving transcoding arrangement 100 to utilize the provided side information, optionally an indication of the provided side information as well as optionally an indication of the potential use of the provided side information is transmitted to and received by the transcoding node. Consequently, the transcoder arrangement 100 comprises an indication identification unit operable to detect the presence of such an indication and how to interpret the provided side information.

As mentioned above, the side information may contain mode/motion information and/or transform coefficients related to potential target output resolutions or target output operation points of a guided transcoder. It may also contain information about parameters for pixel resampling and/or motion resampling (e.g. filters used), loop-filter parameters for a target output resolution (e.g., de-blocking parameters or SAO, sample adaptive offset, parameters), quantization parameters to be used in the encoding stage of the transcoder, or other encoding parameters. The parameters in the side information can be coded with dependency on related parameters in the main video bitstream, e.g. differential coding can be applied, similar to scalable coding.

The adaptation methods mentioned above can be varied over time, e.g., different methods may be applied for different pictures in the video. Accordingly, the type and amount of side information may vary. For instance, side information for guided transcoding may be sent for some pictures, whereas no side information may be sent for some other pictures (e.g. non-reference pictures). Using such variations, a trade-off between the amount of side information transmitted and the transcoding complexity can be selected.

Figure 13:
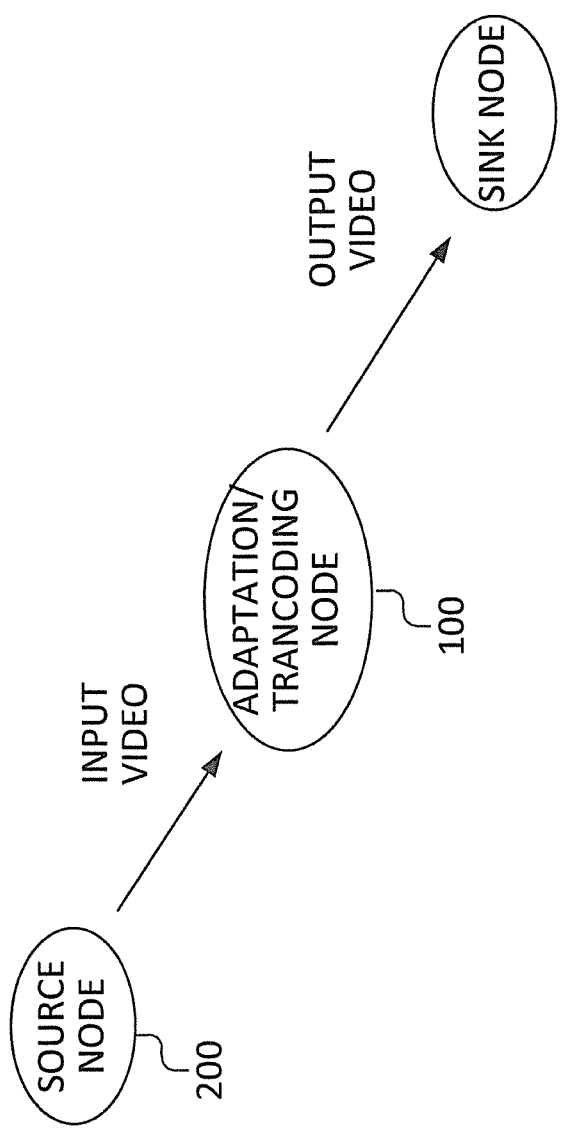
FIG. 13 is a block chart of an embodiment of a system according to the proposed technology.

With reference to FIG. 13, a brief overview of an embodiment of a system of the proposed technology will be described. As mentioned previously, for transcoding or adaptation, an input video (or other media) is provided by a video provider arrangement 200 in a source node e.g. base station node or video provider. The video is transmitted to an intermediate node such as an adaptation or transcoding node including a transcoding arrangement 100 according to the proposed technology. In the intermediate node, the input video is processed in order to adapt it to requirements of a destination or sink node and to provide an adapted or transcoder output video bitstream. After processing, the output video is transmitted to the sink node e.g. user equipment or the like, where it can be displayed in its adapted format.

Figure 14:
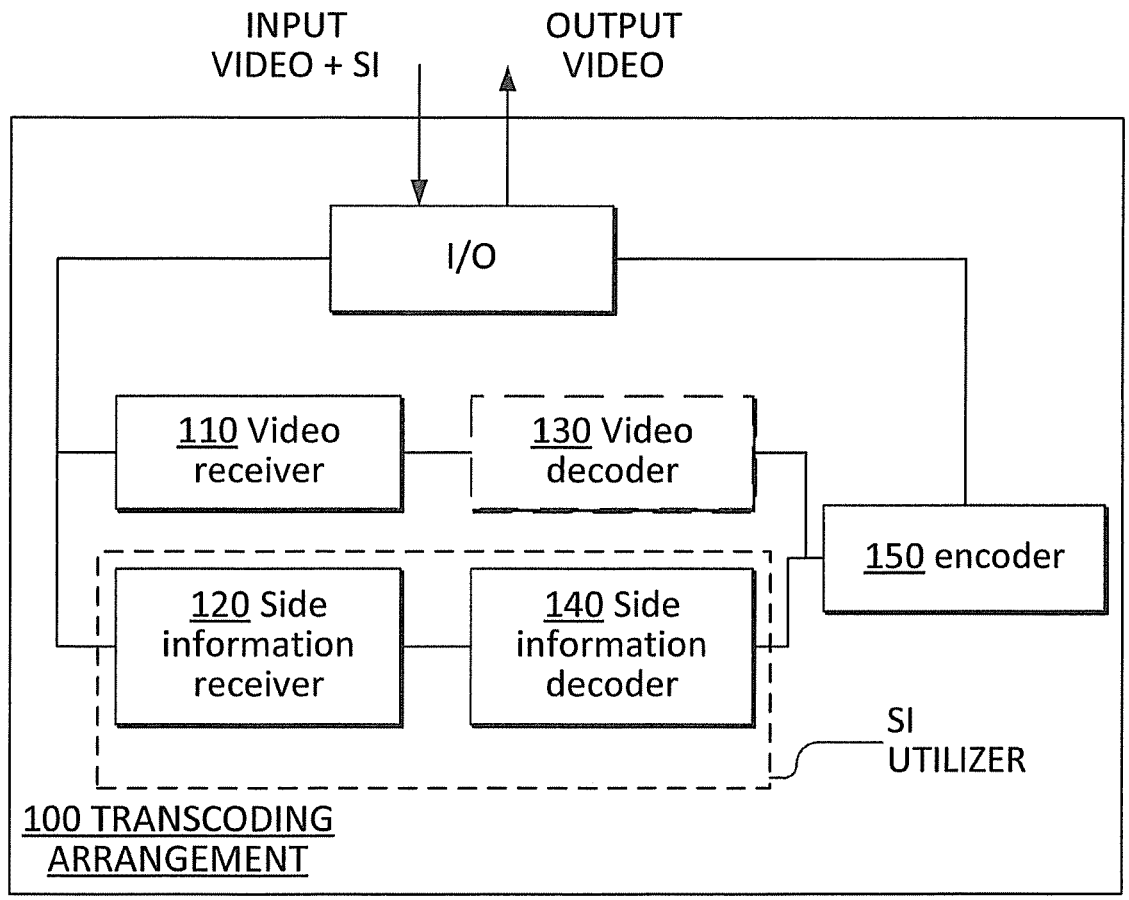
FIG. 14 is a block chart of an embodiment of a transcoding arrangement according to the proposed technology.

With reference to FIG. 14, a general embodiment of a transcoder arrangement 100 for transcoding a video bitstream according to the proposed technology will be described. The arrangement is adapted, configured, or operable to perform all functions as described with reference to the previously described block or flow charts of the embodiments of the transcoding method.

Consequently, the transcoder or adaptation arrangement 100 includes a video receiver 110 configured for receiving a video bitstream with a first predetermined input video format, and at least one side information utilization unit comprising a side information receiver 120 configured for receiving side information related to the video bitstream, the side information comprising at least one of mode or motion or in-loop filter information relating to at least one other predetermined video format for the video bitstream, and a side information decoder 140 configured for decoding said received side information to generate transcoding guiding information. Further the transcoder arrangement 100 includes an encoder 150 configured for encoding a representation of said received video bitstream based at least on said generated transcoding guiding information, to provide a transcoded video bitstream with a predetermined output video format.

According to a further embodiment, the predetermined input video format and said predetermined output video format can be identical or different from each other.

According to yet another embodiment, the side information decoder 140 is configured for decoding the received side information based on at least one of mode or motion or in-loop filter information received in the video bitstream, and the encoder 150 is configured for encoding the representation of the received video bitstream based at least on at least one of the decoded mode or motion or in-loop filter information.

In an additional embodiment the transcoder arrangement is configured for down sampling the mode or motion or in-loop filter information prior to decoding, and the encoder 150 is configured to decode the representation based on the down sampled mode or motion or in-loop filter information.

According to a further embodiment the transcoder arrangement includes a video decoder 130 configured for decoding the received video bitstream to provide pixel data as the representation of the received video bitstream. The video decoder 130 is, according to one embodiment, configured for decoding a high resolution layer of the video bitstream to obtain high resolution pixel data and down sampling the high resolution pixel data to a desired low resolution, and the side information decoder 140 is configured for decoding the mode or motion or in-loop filter data for the desired low resolution, and the encoder 150 is configured for encoding the down sampled pixel data based on the decoded low resolution mode or motion or in-loop filter data. In yet another embodiment, the video decoder 130 is configured for decoding the video bitstream to obtain high fidelity pixel data, and the side information decoder 140 is configured for decoding the mode and/or motion or in-loop filter data for the desired low fidelity bitstream, and the encoder 150 is configured for encoding the high fidelity pixel data based on the decode low fidelity mode and/or motion or in-loop filter data.

As described with reference to the transcoding method, the side information can further comprise residual information related to the predetermined input video format, and/or search ranges of coding parameters to further enhance the transcoding.

The transcoding arrangement 100 can be configured to receive the side information separately or together with the video bitstream. In order to enable optimal use of the side information, the transcoding arrangement 100 comprises an identifying unit configured for identifying an indication about the presence of said side information within said video bitstream. This identifying unit is typically part of the side information receiver or video receiver.

The transcoding arrangement 100 can be implemented in a network node (fixed or wireless), such as a base station node or a video provider node, or in a user equipment, such as a mobile phone or laptop or similar.

Figure 15:
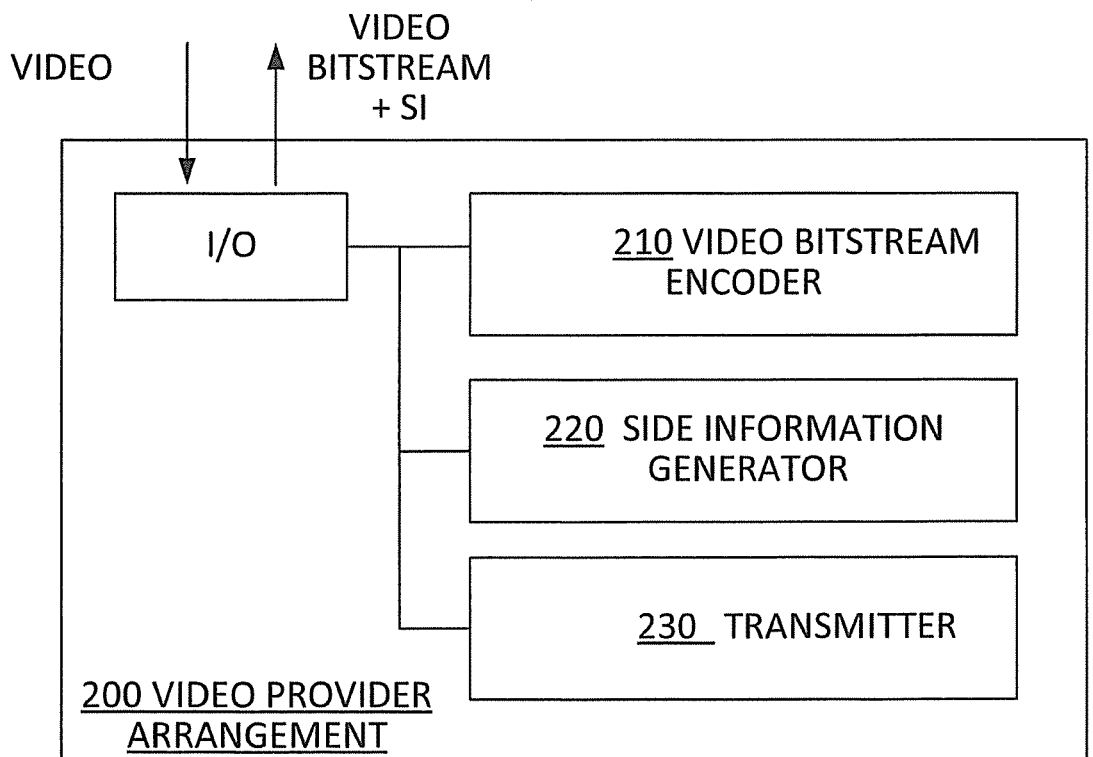
FIG. 15 is a block chart of an embodiment of a video provider arrangement according to the proposed technology.

With reference to FIG. 15, a video provider arrangement 200 will be described. The video provider arrangement 200 is configured, adapted, or operable to provide an input video bitstream to the above described adaptation or transcoder arrangement, as well as aside information relating to one or more representations of the video bitstream. The video provide arrangement 200 includes an encoder 210 configured for encoding a video bitstream with a predetermined video format, and a side information generator 220 configured for generating side information related to the video bitstream, the side information comprising at least one of mode or motion or in-loop filter information relating to at least one other representation or predetermined video format for the video bitstream. The generated side information can be used to enable transcoding of the provided video bitstream in a transcoder arrangement 100 according to the previously described embodiments by supporting generation of transcoding guiding information in the transcoding arrangement. Finally, the video provider arrangement 200 includes a transmitter 230 configured for transmitting the encoded video bitstream and the generated side information. According to different embodiments, the transmitter 230 can be configured to transmit the side information and the video bitstream separately in a same channel, separately in different channels, or interleaved in a same layer in a same channel, or in some other manner provide the side information and the video bitstream to a transcoding arrangement or node.

In order to facilitate the use of the side information in a receiving transcoder arrangement the transmitter 230 is configured for providing an indication about the presence of the side information.

The video provider arrangement 200 can be included in a network node or a user equipment.

In the following section a comparison of the benefits of the proposed over prior art solutions will be described. The following table, Table 2, provides a quantitative estimate on the performance of simulcast delivery (prior art), scalable coding (prior art), conventional transcoding (prior art) and guided transcoding according to the embodiment described with reference to FIG. 9. It is assumed that two video representations are required, a low resolution (e.g. 960×540 pixels) and a 4× higher resolution (e.g. 1920×1080 pixels), both having the same frame rate (frames per second, fps, e.g. 60 fps). It is also assumed that the bit rate ratio for compressing those resolutions (using single layer coding) is r=3, i.e. the high resolution representation would require 3× the number of bits compared to the low resolution representation, in order to provide the desired video qualities. All numbers are normalized.

Encoding complexity is normalized with respect to encoding only the high resolution, using non-scalable encoding. Since the low resolution has 4 times fewer pixels, its complexity is assumed to be 0.25. All solutions except for conventional transcoding perform mode/motion estimation (which is assumed to determine the complexity of the encoding) for both target resolutions, resulting in an estimated encoder complexity of 1.25. Conventional transcoding performs mode/motion estimation only for the high resolution, resulting in an estimated complexity of 1.0.

TABLE 2

Quantitative estimate of performance of simulcast delivery

|  | Simulcast | Scalable coding | Transcoding | Guided transcoding |
| --- | --- | --- | --- | --- |
| Encoding complexity | 1.25 | 1.25 | 1.0 | 1.25 |
| Uplink bit rate | 1.33 | 1.2 | 1.0 | 1.1 |
| Adaptation complexity | 0.0 | 0.0 | 1 + N * 0.25 | 1.25 |
| Downlink bit rate (high/low) | 1.0/0.33 | 1.2/0.33 | 1.0/0.36 | 1.0/0.36 |
| Decoding complexity (high/low) | 1.0/0.25 | 1.25/0.25 | 1.0/0.25 | 1.0/0.25 |

The uplink bit rate is normalized with respect to the single layer coding bit rate of the high resolution. Here, scalable coding is estimated to have 20% overhead compared to single layer coding (see numbers in the background section). The side information used in the guided transcoding is assumed to be 10% of the high-resolution video bit rate based on assumption that 30% of the low resolution single layer video bitstream is mode/motion data that needs to be transmitted as side information (coefficient data would not be transmitted, as described in embodiment 5). Normalizing with r=3, the additional bit rate is 10%. Note that the fraction of mode/motion data in the low-resolution video may be higher than 30%, which would increase the amount of side information. However, note also that the side information may be coded with dependency on the high-resolution video, which would decrease the size of coded side information.

The adaptation complexity is normalized with respect to the complexity for decoding the high resolution. For simulcast and scalable coding, adaptive forwarding is needed only, which has very low complexity. For transcoding, several steps are needed, (1) decoding the high resolution, (2) resampling, (3) encoding the low resolution. Setting decoding complexity to 1, assuming that the resampling has complexity <<1, assuming that encoding is N times more complex than decoding, and assuming that the encoding/ decoding complexity is a linear function of the number of pixels to process, the adaptation complexity is $1_+N*0.25$. For guided transcoding, since mode/motion estimation can be saved, it is assumed that the encoding stage is as complex as an equivalent decoding stage, thus the adaptation complexity is estimated as $1+0.25=1.25$.

The estimated downlink bit rate is normalized with respect to the single layer high resolution bit rate, and it is depicted both for the high and the low-resolution. For conventional transcoding and guided transcoding, it is assumed that the transcoding operation causes around 10% extra coding efficiency loss for the low-resolution video. Note that since for guided transcoding, mode/motion estimation can utilize original video data, the low-resolution bit rate overhead may be lower than for conventional transcoding.

The estimated decoding complexity is normalized with respect to the complexity of high resolution single layer decoding, and provided both for high- and low-resolution. Simulcast, conventional transcoding, and guided transcoding have the same decoding complexity since they employ conventional single layer decoding. Scalable coding requires decoding of both base layer and enhancement layer for obtaining the high resolution, which requires higher decoding complexity.

The following table, Table 3, provides a similar performance analysis for SNR scalable coding with two target representations, i.e. where resolution and frame rate of both target representations are the same, e.g. 1920×1080 pixels and 60 fps, but the bit rates are different, with $r=3$.

TABLE 3

Performance analysis for SNR scalable coding

| | Simulcast | Scalable coding | Transcoding | Guided transcoding |
|---|---|---|---|---|
| Encoding complexity | 2.0 | 2.0 | 1.0 | 2.0 |
| Uplink bit rate | 1.33 | 1.2 | 1.0 | 1.1 |
| Adaptation complexity | 0.0 | 0.0 | 1 + N | 2.0 |
| Downlink bit rate (high/low) | 1.0/0.33 | 1.2/0.33 | 1.0/0.36 | 1.0/0.36 |
| Decoding complexity (high/low) | 1.0/1.0 | 2.0/1.0 | 1.0/1.0 | 1.0/1.0 |

As can be seen from the tables, guided transcoding provides balanced bandwidth utilization in both uplink and downlink. Compared to simulcast, which is often used today, it provides significant savings in the uplink while only slightly sacrificing the downlink bandwidth utilization (only for the low resolution/quality). Compared to scalable coding, it provides savings both in the uplink and downlink. Conventional transcoding has similar downlink efficiency and better uplink efficiency, however depending on the complexity of the encoder stage in the transcoder (i.e. essentially the factor N), guided transcoding according to the proposed technology provides a significant benefit in terms of adaptation complexity.

Guided transcoding according to the proposed technology can thus be a viable alternative for environments where otherwise simulcast would be employed (e.g. video on demand distribution or video conferencing), providing uplink savings at moderate adaptation complexity. It may also provide a viable alternative for environments where otherwise scalable coding would be employed (e.g. video conferencing), providing both uplink and downlink savings as well as decoding complexity savings, at the cost of moderate adaptation complexity. It may also provide a viable alternative for environments where otherwise conventional transcoding would be employed (e.g. video on demand distribution), providing lower adaptation complexity than conventional transcoding in particular if highly efficient encoding (with $N>>1$) is used, at the cost of increased encoding complexity and slightly increased uplink bit rate. Reducing adaptation complexity may be particularly relevant in scenarios with a single sender and many adaptation nodes (e.g. video on demand distribution).

It will be appreciated that the methods and devices described above can be combined and re-arranged in a variety of ways.

For example, embodiments may be implemented in hardware, or in software for execution by suitable processing circuitry, or a combination thereof.

The steps, functions, procedures, modules, and/or blocks described above may be implemented in hardware using any conventional technology, such as discrete circuit or integrated circuit technology, including both general-purpose electronic circuitry and application-specific circuitry.

Particular examples include one or more suitably configured digital signal processors and other known electronic circuits, e.g. discrete logic gates interconnected to perform a specialized function, or Application Specific Integrated Circuits (ASICs).

Alternatively, at least some of the steps, functions, procedures, modules, and/or blocks described above may be implemented in software such as a computer program for execution by suitable processing circuitry including one or more processing units.

The flow diagram or diagrams presented above may therefore be regarded as a computer flow diagram or diagrams, when performed by one or more processors. A corresponding apparatus may be defined as a group of function modules, where each step performed by the processor corresponds to a function module. In this case, the function modules are implemented as a computer program running on the processor.

Figure 16:
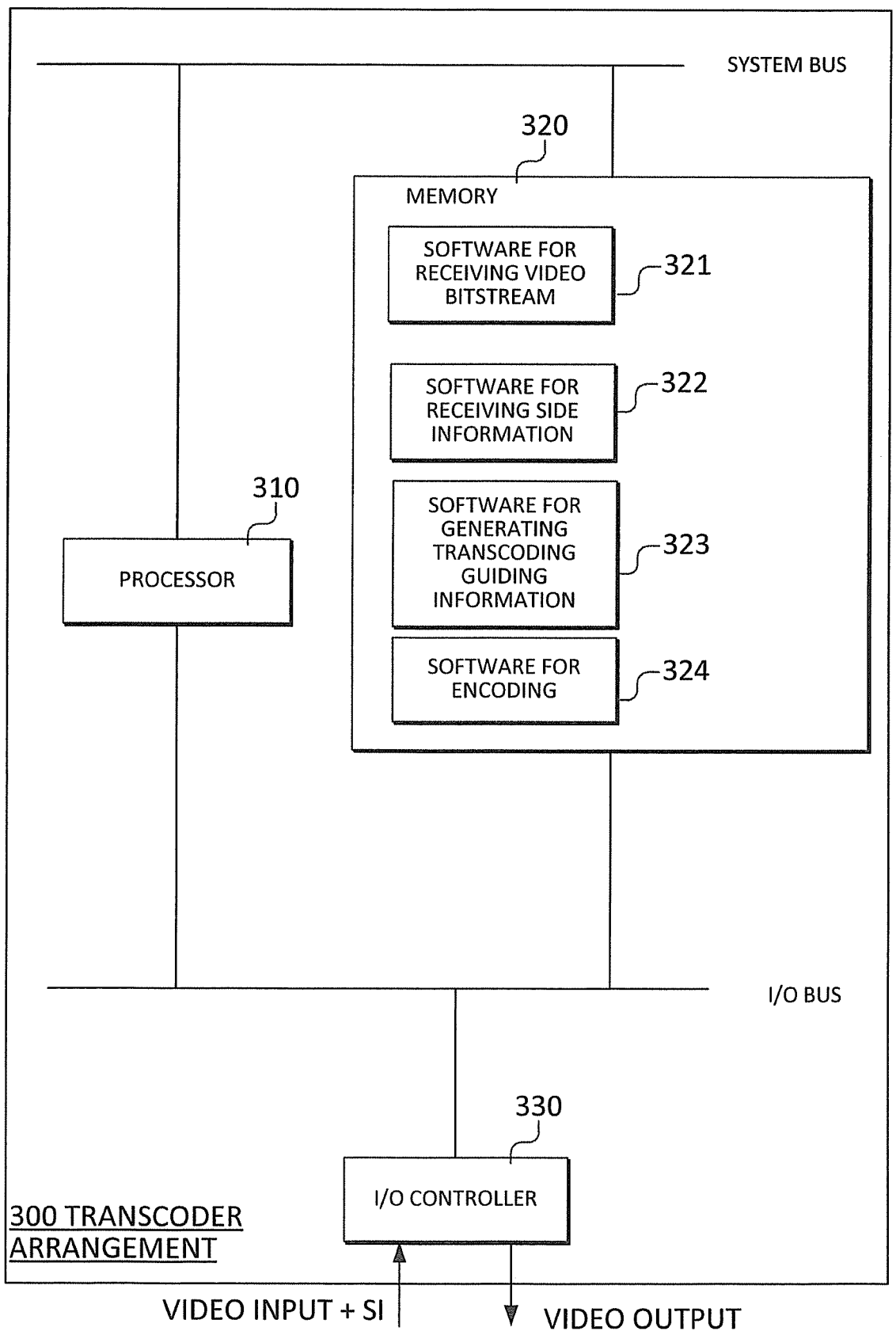
FIG. 16 is an illustration of a computer implementation of a transcoding arrangement according to the proposed technology.

Consequently, and with reference to FIG. 16, an arrangement 300 for transcoding of a video bitstream, comprises a video bitstream receiving module 321 for receiving a video bitstream with a first predetermined input video format and a side information receiving module 322 for receiving side information related to the video bitstream, the side information comprising at least one of mode, motion or in-loop filter information relating to at least one other predetermined video format for the video bitstream. Further, the arrangement includes a decoding module 323 for decoding said received side information to generate transcoding guiding information, and an encoding module 324 for encoding a representation of said received video bitstream based at least on said generated transcoding guiding information, to provide a transcoded video bitstream with a predetermined output video format.

Figure 17:
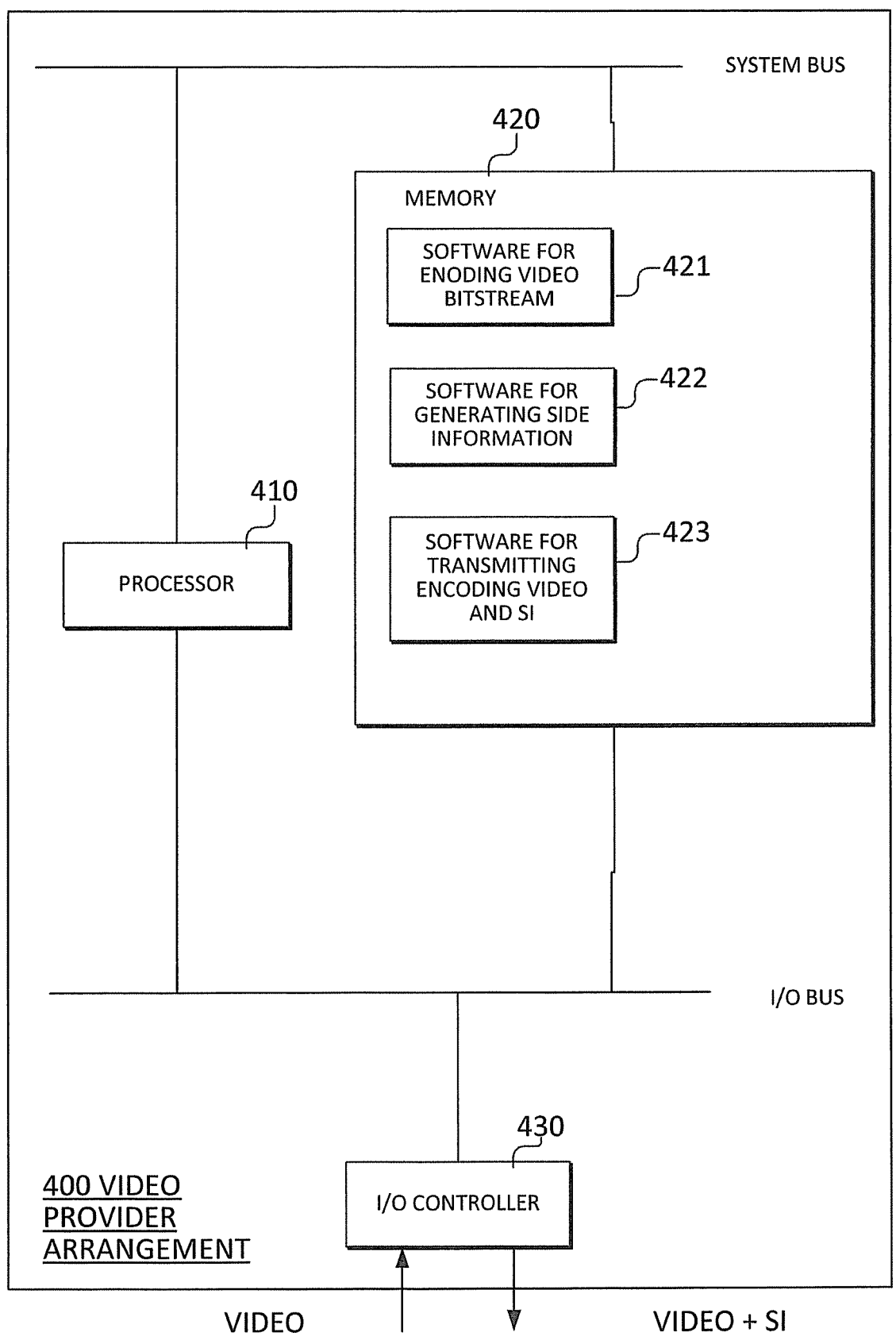
FIG. 17 is an illustration of a computer implementation of a video provider arrangement according to the proposed technology.

Also, with reference to FIG. 17, an arrangement 400 for providing a video bitstream, includes an encoder module 421 for encoding a video bitstream with a predetermined video format, a side information module 422 for generating side information related to the video bitstream, the side information comprising at least one of mode, motion or in-loop filter information relating to at least one other predetermined video format for the video bitstream, and a transmitter module 423 for transmitting the encoded video bitstream and the generated side information.

Examples of processing circuitry includes, but is not limited to, one or more microprocessors, one or more Digital Signal Processors, DSPs, one or more Central Processing Units, CPUs, video acceleration hardware, and/or any suitable programmable logic circuitry such as one or more Field Programmable Gate Arrays, FPGAs, or one or more Programmable Logic Controllers, PLCs.

It should also be understood that it may be possible to re-use the general processing capabilities of any conventional device or unit in which the proposed technology is implemented. It may also be possible to re-use existing software, e.g. by reprogramming of the existing software or by adding new software components.

In the following, an example of a computer implementation of a transcoder arrangement 300 will be described with reference to FIG. 16. The transcoder arrangement 300 comprises processing circuitry such as one or more processors 310 and a memory 320. In this particular example, at least some of the steps, functions, procedures, modules and/or blocks described above are implemented in a computer program, which is loaded into the memory for execution by the processing circuitry. The processing circuitry and memory are interconnected to each other to enable normal software execution. An optional input/output device 330 may also be interconnected to the processing circuitry and/or the memory to enable input and/or output of relevant data such as input parameter(s) and/or resulting output parameter(s).

In the following, an example of a computer implementation of a video provider arrangement 400 will be described with reference to FIG. 17. The transcoder arrangement 400 comprises processing circuitry such as one or more processors 410 and a memory 420. In this particular example, at least some of the steps, functions, procedures, modules and/or blocks described above are implemented in a computer program, which is loaded into the memory for execution by the processing circuitry. The processing circuitry and memory are interconnected to each other to enable normal software execution. An optional input/output device 430 may also be interconnected to the processing circuitry and/or the memory to enable input and/or output of relevant data such as input parameter(s) and/or resulting output parameter(s).

The term 'computer' should be interpreted in a general sense as any system or device capable of executing program code or computer program instructions to perform a particular processing, determining or computing task.

In a particular embodiment, the computer program comprises program code which when executed by the processing circuitry or computer causes the processing circuitry or computer to perform the steps and functions as described with reference to the above-described embodiments of a transcoding method and a video providing method.

The program code may be organized as appropriate functional modules configured to perform, when executed by the processing circuit, at least part of the steps and/or tasks described above.

The software or computer program may be realized as a computer program product, which is normally carried or stored on a computer-readable medium. The computer-readable medium may include one or more removable or non-removable memory devices including, but not limited to a Read-Only Memory, ROM, a Random Access Memory, RAM, a Compact Disc, CD, a Digital Versatile Disc, DVD, a Universal Serial Bus, USB, memory, a Hard Disk Drive, HDD storage device, a flash memory, or any other conventional memory device. The computer program may thus be loaded into the operating memory of a computer or equivalent processing device for execution by the processing circuitry thereof.

For example, the computer program stored in memory includes program instructions executable by the processing circuitry, whereby the processing circuitry is able or operative to execute the above-described steps, functions, procedure and/or blocks.

The video provider and the transcoding arrangement are thus configured to perform, when executing the computer program, well-defined processing tasks such as those described above.

The computer or processing circuitry does not have to be dedicated to only execute the above-described steps, functions, procedure, and/or blocks, but may also execute other tasks.

Examples of advantages of the proposed technology include:
  a good trade-off between encoding complexity, adaptation complexity, decoding complexity, and bandwidth utilization in uplink and downlink.
  zero loss in coding efficiency for coding the highest operating point (resolution) compared to single layer coding while achieving better coding efficiency compared to coding the operating points separately, i.e. simulcast.
  assist to achieve low complex transcoding with small loss in coding efficiency for another point of operation (smaller resolution).

Although the embodiments of the current disclosure are described in the context of a network node as a source, an adaptation node and a user equipment as a sink, it equally applicable that the adaptation or transcoding takes place in a user equipment or a base station node.

The embodiments described above are merely given as examples, and it should be understood that the proposed technology is not limited thereto. It will be understood by those skilled in the art that various modifications, combinations and changes may be made to the embodiments without departing from the present scope as defined by the appended claims. In particular, different part solutions in the different embodiments can be combined in other configurations, where technically possible.

The invention claimed is:

1. A method for transcoding a video bitstream, comprising:
  receiving a video bitstream with a predetermined input video format;
  receiving side information related to an original video format of the received video bitstream, said side information comprising at least one of: a mode or a motion;
  generating transcoding guiding information for encoding the received video bitstream, the transcoding guiding information based on the received side information and comprising at least one of: a suggested mode or a suggested motion; and
  sending the transcoding guiding information to a transcoding node.

2. The method of claim 1, wherein generating the transcoding guiding information comprises performing a resampling operation to reduce a low resolution version of said received video bitstream.

3. The method of claim 1, wherein generating the transcoding guiding information comprises performing a rate-distortion optimization based on a bit rate required to transmit said video bitstream.

4. The method of claim 1, wherein generating the transcoding guiding information comprises determining a coding parameter based on at least one of: a resulting video distortion after reconstructing said received video bitstream or a bit rate required for coding said received video bitstream.

5. The method of claim 1, wherein the side information contains one or more low quality representations of a video, wherein the one or more low quality representations are compressed with dependency on a high-quality representation of the video.

6. The method of claim 1, wherein the side information contains a partially-coded low resolution video representation comprising mode information and motion information.

7. The method of claim 1, wherein sending the transcoding guiding information further comprises sending the transcoding guiding information as one layer of scalable video bitstream.

8. The method of claim 1, wherein sending the transcoding guiding information further comprises:
sending the transcoding guiding information as a first video bitstream to the transcoding node; and
sending the video bitstream with a predetermined input video format as a second video bitstream to the transcoding node.

9. The method of claim 1, wherein the side information further comprises in-loop filter information relating to at least one other predetermined video format for said video bitstream.

10. The method of claim 1, wherein the transcoding guiding information further comprises at least one of: a suggested filter search strategy, a suggested quantization strategy, or a suggested application method for a quantization strategy.

11. A system for transcoding a video bitstream, comprising:
a transmitter;
a memory; and
a processor, the processor coupled to the memory and configured to:
receive a video bitstream with a predetermined input video format;
receive side information related to an original video format of the received video bitstream, said side information comprising at least one of: a mode or a motion;
generate transcoding guiding information for encoding the received video bitstream, the transcoding guiding information based on the received side information and comprising at least one of: a suggested mode or a suggested motion; and
employ the transmitter to transmit the transcoding guiding information to a transcoding node.

12. The system of claim 11, wherein generating the transcoding guiding information comprises performing a resampling operation to reduce a low resolution version of said received video bitstream.

13. The system of claim 11, wherein generating the transcoding guiding information comprises performing a rate-distortion optimization based on a bit rate required to transmit said video bitstream.

14. The system of claim 11, wherein generating the transcoding guiding information comprises determining a coding parameter based on at least one of: a resulting video distortion after reconstructing said received video bitstream or a bit rate required for coding said received video bitstream.

15. The system of claim 11, wherein the side information contains one or more low quality representations of a video, wherein the one or more low quality representations are compressed with dependency on a high-quality representation of the video.

16. The system of claim 11, wherein the side information contains a partially-coded low resolution video representation comprising mode information and motion information.

17. The system of claim 11, wherein sending the transcoding guiding information further comprises sending the transcoding guiding information as one layer of scalable video bitstream.

18. A computer program product comprising a non-transitory computer readable medium storing a computer program comprising instructions which when executed by processing circuitry causes the processing circuitry to perform the method of:
receiving a video bitstream with a predetermined input video format;
receiving side information related to an original video format of the received video bitstream, said side information comprising at least one of: a mode or a motion;
generating transcoding guiding information for encoding the received video bitstream, the transcoding guiding information based on the received side information and comprising at least one of: a suggested mode or a suggested motion; and
sending the transcoding guiding information to a transcoding node.

19. The computer program product of claim 18, wherein generating the transcoding guiding information comprises performing a resampling operation to reduce a low resolution version of said received video bitstream.

20. The computer program product of claim 18, wherein generating the transcoding guiding information comprises performing a rate-distortion optimization based on a bit rate required to transmit said video bitstream.

* * * * *